United States Patent
Edmonds et al.

(10) Patent No.: US 10,163,117 B2
(45) Date of Patent: Dec. 25, 2018

(54) SYSTEM, METHOD, AND COMPUTER PROGRAM PRODUCT FOR MODEL-BASED DATA ANALYSIS

(71) Applicant: Knowledge Leaps Disruption, Inc., San Francisco, CA (US)

(72) Inventors: Douglas Michael Edmonds, San Francisco, CA (US); Dominic Fried-Booth, Leicester (GB)

(73) Assignee: Knowledge Leaps Disruption, Inc., San Francisco, CA (US)

( * ) Notice: Subject to any disclaimer, the term of this patent is extended or adjusted under 35 U.S.C. 154(b) by 725 days.

(21) Appl. No.: 14/602,153

(22) Filed: Jan. 21, 2015

(65) Prior Publication Data

US 2016/0210646 A1 Jul. 21, 2016

Related U.S. Application Data

(60) Provisional application No. 62/104,647, filed on Jan. 16, 2015.

(51) Int. Cl.
*G06Q 30/02* (2012.01)
*H04L 29/08* (2006.01)

(52) U.S. Cl.
CPC ..... *G06Q 30/0203* (2013.01); *G06Q 30/0201* (2013.01); *H04L 67/02* (2013.01)

(58) Field of Classification Search
CPC ......... G06Q 10/00; G06Q 40/06; G06F 17/60
USPC ................................................ 705/7.29, 7.32
See application file for complete search history.

(56) References Cited

U.S. PATENT DOCUMENTS

| | | | | |
|---|---|---|---|---|
| 4,603,232 A | * | 7/1986 | Kurland | G06K 17/0022 379/92.04 |
| 5,740,035 A | * | 4/1998 | Cohen | G06Q 30/02 235/384 |
| 5,842,195 A | * | 11/1998 | Peters | G06Q 30/02 |
| 6,093,026 A | * | 7/2000 | Walker | G06Q 10/063112 434/236 |
| 6,233,564 B1 | * | 5/2001 | Schulze, Jr. | G06Q 30/02 235/380 |
| 7,950,026 B1 | | 5/2011 | Urbach | |
| 8,239,310 B2 | | 8/2012 | Lortscher, Jr. | |
| 8,712,824 B1 | | 4/2014 | Julian et al. | |
| 8,805,759 B1 | | 8/2014 | Cha et al. | |

(Continued)

FOREIGN PATENT DOCUMENTS

WO WO2014151999 A1 9/2014

OTHER PUBLICATIONS

Market Facts, "Letting Consumers Make the Call," Press release, Sep. 24, 1996, p. (2), downloaded Aug. 5, 1999.*

(Continued)

*Primary Examiner* — Romain Jeanty
(74) *Attorney, Agent, or Firm* — Zilka-Kotab, P.C.

(57) ABSTRACT

A system, method, and computer program product for a model-based data analysis system is disclosed. The method includes the steps of receiving information from one or more respondents that includes at least one response to a question included in a first survey, updating a model based on the received information, and generating a second survey based on the updated model. The method may be implemented by a server application communicating with a client application via a network.

19 Claims, 14 Drawing Sheets

(56) References Cited

U.S. PATENT DOCUMENTS

| | | | |
|---|---|---|---|
| 2002/0052774 A1* | 5/2002 | Parker | G06Q 30/02 |
| | | | 705/7.32 |
| 2005/0021388 A1 | 1/2005 | Hatcher et al. | |
| 2013/0218951 A1 | 8/2013 | Scaletta | |
| 2014/0229237 A1 | 8/2014 | Tryfon | |
| 2014/0272898 A1 | 9/2014 | Ryan et al. | |

OTHER PUBLICATIONS

International Search Report and Written Opinion from International Application No. PCT/US2015/068349, dated Mar. 17, 2016.
Shannon, C. E., "A Mathematical Theory of Communication," Reprinted with corrections from The Bell System Technical Journal, vol. 27, pp. 379-423, 623-656, Jul., Oct. 1948 (55 pages).

* cited by examiner

SYSTEM, METHOD, AND COMPUTER PROGRAM PRODUCT FOR MODEL-BASED DATA ANALYSIS

RELATED APPLICATIONS

This application claims priority to U.S. Provisional Application No. 62/104,647, filed Jan. 16, 2015, which is herein incorporated by reference.

FIELD OF THE INVENTION

The present invention relates to data analysis systems, and more particularly to automated, analysis of datasets collected based on market research surveys.

BACKGROUND

Market research surveys are a useful tool for enabling companies to target particular audiences that are more apt to purchase their services or products. For example, market research surveys may be used to find that male respondents are twice as likely as female respondents to purchase a particular product. Based on the knowledge gleaned from the survey results, the company may decide to direct more advertising dollars to areas that are more heavily associated with a male audience. For example, advertisements may be directed to sporting events or video games that are conventionally consumed by a heavily male dominated audience.

Market research surveys are conventionally conducted through various mediums such as in-person, over the phone, and, more recently, through online systems. Online systems for conducting market research tend to be cheaper to implement because they do not require a researcher to ask the questions and record a respondent's answers, like in-person or over the phone techniques require. However, such systems still require a certain level of management by a researcher to create the surveys and analyze the answers provided by the respondents. For example, a researcher may design a set of questions to include in a survey. The survey may then be answered by 100 respondents. The researcher may then analyze the responses provided by the group of respondents and, based on the analysis, adjust the questions included in the survey. The modified survey may then be answered by additional respondents. The researcher may then analyze the responses provided by both the initial group of respondents and the new group of respondents.

As described above, conventional systems for creating market surveys and collecting data associated with the responses provided by a group of respondents tend to rely heavily on manual manipulation of the survey questions and survey design. This requires a high level of control by a researcher conducting the market research and may take a long time to achieve the desired results. For example, each cycle of creating a new survey, conducting the survey, and analyzing the results may take a significant amount of time. Furthermore, in order to arrive at statistically relevant data, multiple cycles may need to be performed in order to achieve reliable results. This may stretch the time required to conduct accurate market research into many weeks or months. Thus, there is a need for addressing this issue and/or other issues associated with the prior art.

SUMMARY

A system, method, and computer program product for a model-based data analysis system is disclosed. The method includes the steps of receiving information from one or more respondents that includes at least one response to a question included in a first survey, updating a model based on the received information, and generating a second survey based on the updated model. The method may be implemented by a server application communicating with a client application via a network.

DETAILED DESCRIPTION

Figure 1:
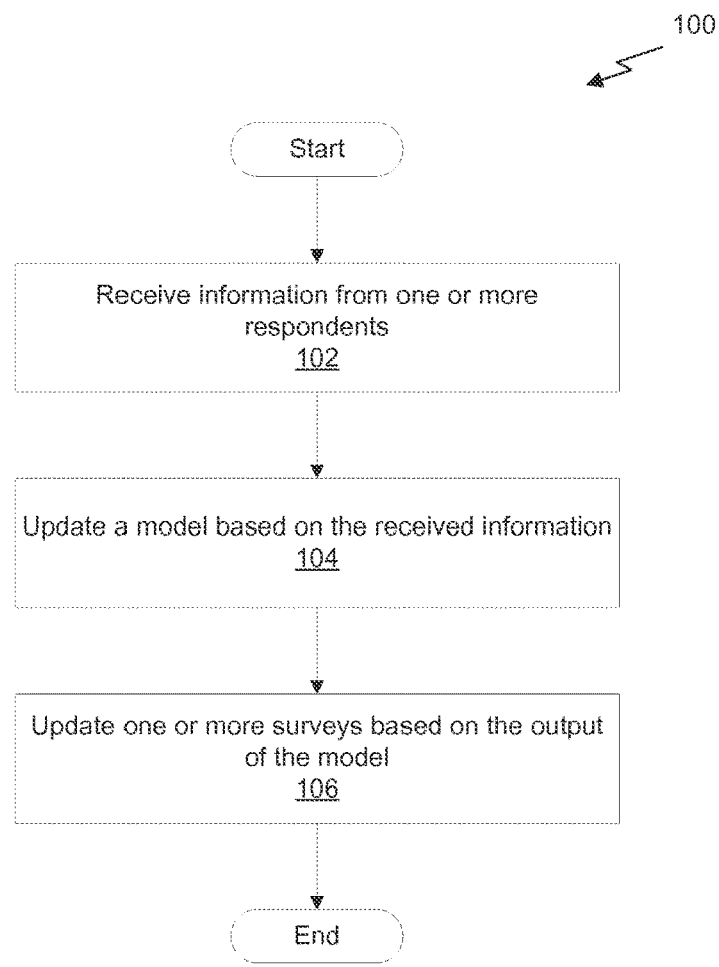
FIG. 1 is a flow chart of a method for dynamically updating a model for generating a market research survey, in accordance with one embodiment.

Market research surveys are a useful tool for collecting large amounts of data about a certain population. The surveys comprise a set of questions that are designed to provide details about the population. A set of respondents is chosen from the population to provide answers to the set of questions. Each respondent may answer the set of questions based on their personal traits, qualities/preferences, and/or experiences. The resulting dataset collected from the set of respondents may then be analyzed to provide insight into the market associated with the population.

The creation and availability of online tools and systems for conducting market research may make it easier for marketing personnel to create and conduct surveys. Furthermore, the content of the surveys may be updated dynamically in response to the answers provided by a specific respondent and/or the answers provided by a number of previous respondents. Modeling may be performed to increase the effectiveness of a particular survey. In one embodiment, a model anticipates the responses provided by a sample of a given population and changes the questions in a survey based on an analysis of the previous responses received from one or more respondents. For example, a model may predict that 45% of men regularly purchase tickets for professional sporting events while 75% of women do not regularly purchase tickets for professional sporting events, based on the responses of previous respondents to other surveys. A survey may be designed that includes a first question that asks the respondent whether the respondent's gender is male or female. If the respondent indicates their gender is male, then the survey content may be updated to include more questions related to sporting events. However, if the respondent indicates their gender is female, then the survey content may be updated to ask different questions unrelated to sporting events.

In addition to the responses provided by the respondents to survey questions the model may also be based on additional data. In one embodiment, the model may be based, at least in part, on behavioral data collected outside of the surveys. For example, the behavioral information may include data about the types of people that make in-app purchases or the types of people that gamble at least $2,000 a year in Las Vegas. Such behavioral data can be collected, for example, by mining business records of one or more companies about their customers. Such data may be useful in predicting the responses provided by respondents to specific questions and may be used to tailor the types of questions included in surveys provided to particular respondents. In addition to behavioral information, other types of information, such as information about locations, may be used to affect the model.

In one embodiment, the behavioral data and/or other types of information may include data retrieved from a mobile device. For example, a respondent may access an application on a mobile phone of the respondent to complete one or more surveys. However, in addition to the explicit response data provided by the respondent to the questions in the survey, the application may also retrieve additional information about the respondent. The additional information may include behavioral data such as how often the respondent opens the application, what websites the respondent views on the mobile device, whether the respondent listens to music on the mobile device, etc. In one embodiment, the additional information may also include contextual information about the mobile device, such as a type of device, a location of the mobile device, a time, connections to nearby devices, detection of nearby friends/users, etc. Such additional information may also be utilized by a model to make predictions. In one embodiment, any contextual information associated with the mobile device may be used to make predictions and/or be leveraged in any manner in relation to the survey.

The models may be utilized by a data analysis engine to create dynamic surveys that are provided to a number of respondents. The dynamic surveys enable new questions to be asked that tailor the survey to the population responding to the survey. The dynamic nature of the market research surveys described herein enable more useful information to be collected in a shorter timeframe than conventional systems that require a researcher to manually analyze and change the content of the surveys to get the same results. Furthermore, the models described herein may also allow for the surveys to be completed by a fewer number of respondents to get statistically relevant results when the received responses correlate with the expected responses predicted by the model.

FIG. 1 is a flow chart of a method 100 for dynamically updating a model for generating a market research survey, in accordance with one embodiment. As shown in FIG. 1, at step 102, a survey engine receives information from one or more respondents. In one embodiment, the information may comprise a set of answers to a corresponding set of questions included in a survey completed by each respondent. Of course, in one embodiment, each respondent may be included in the one or more respondents. Each survey completed by a respondent may be the same or different from the surveys completed by the other respondents. In other words, each respondent may independently submit answers to a specific subset of questions included in the survey for that respondent. The information received by the survey engine may include the answers to each question submitted to the respondent and not every respondent will have submitted an answer to each question.

As used herein a survey includes a set of questions and a corresponding set of potential answers. For example, each question in a survey may include a plurality of potential answers that a respondent may select as the respondent's answer to that particular question. In one embodiment, the answers may be provided in a multiple choice format that allows a respondent to select one or more answers as the respondent's answer to a particular question. In another embodiment, the answers may include a field that can be filled out by the respondent to provide any answer of the respondent's choice to a particular question.

In one embodiment, a market research analyst may design a set of surveys associated with a particular market research project. The market research project may include more than one survey that asks questions to different sets of respondents to generate data about a population (i.e., the market participants), a sample of which comprises the respondents. By including different surveys in the market research project, changing the order of questions in the surveys, or including related, but slightly different, questions in each of the different surveys in the market research project, the market research analyst may glean more accurate assumptions about the population than if a single survey were asked to all of the respondents sampled from the population. For example, results from long surveys may be less accurate than results from short surveys because the respondents become less enthusiastic about providing accurate answers to long surveys. By splitting a large number of questions into different smaller surveys completed by different subsets of the respondents, the results may be more accurate.

At step 104, an analysis engine updates a model based on the information received from the one or more respondents. The model may be used to predict responses from one or more respondents based on responses provided by other respondents, in the same or different market research project as well as any other data used by the model. The analysis engine may receive a data structure that includes model parameters needed for the analysis engine to make a prediction for a particular question included in a survey completed by one or more respondents. The analysis engine may update the model based on the information received from the survey engine and then execute instructions that implement a specific algorithm to analyze the information and create an output. The output may include an accuracy of the prediction calculated by the analysis engine. After the model has been run, one or more actions may be taken to update the surveys provided to the one or more respondents.

For example, a model may predict that a specific percentage of women enjoy shopping for clothes while a smaller percentage of men enjoy shopping for clothes. Another model may also predict that a particular percentage of the market participants are men versus women. Yet another model may also predict that, of the women that enjoy shopping for clothes, a percentage of those women tend to spend more than $300 while shopping at a particular store. In general, for each potential question included in the survey, the model(s) may be run by the analysis engine to predict what percentage of respondents will select each answer corresponding to that particular question as well as provide an estimation of the accuracy of that prediction.

The model(s) may also correlate different questions that may be included in a particular survey such that an answer to a particular question will be more statistically relevant to a given population of respondents that has provided a specific answer to a previously provided question in the survey. In other words, the model(s) may identify relationships between related and/or unrelated questions. For example, a question about purchasing tools from a hardware store may be more statistically relevant if a respondent answers that the respondent is male than if the respondent is female. Similarly, a question about purchasing makeup from a beauty store may be more statistically relevant if a respondent answers that the respondent is female than if the respondent is male. Although the above example relates an immutable characteristic of the respondent to the statistical relevance of a question, behavioral traits or other traits assumed based on answers to previously provided questions may also be used to determine statistical relevance of any given question. For example, the model may identify that people that like dogs are more likely to shop at Target than people that like cats. Even though the questions appear unrelated, the model may discover a correlation between the questions based on an analysis of the response data.

In one embodiment, a model may not exist when a market research project is initiated. For example, a model may not be effective without some threshold amount of survey response data from a number of respondents. In such an embodiment, the model is not run by the analysis engine until a threshold number of respondents have completed a survey. Once the threshold number of respondents have completed the survey, the analysis engine may begin to run the model and update the surveys provided to the respondents.

At step 106, the survey engine updates one or more surveys based on the output of the model. In one embodiment, the output of the analysis engine may cause one or more surveys to be removed from an active survey list (i.e., deactivated), which indicates which surveys are available to be completed by the respondents. In addition, one or more additional surveys may be added to the active survey list (i.e., activated). One or more respondents may then be able to complete the new surveys added to the active survey list. The surveys may be pre-defined by a market research analyst. The particular surveys that are activated or deactivated may be specified based on the output of the model and, therefore, the progression of the market research project (i.e., the order and number of questions asked to the respondents) is dependent on the model run by the analysis engine.

In another embodiment, the survey engine may automatically select a set of questions from a pool of available questions to be included in a survey based on the output of the analysis engine. In one embodiment, one or more models may be updated after each respondent completes a survey. The model may be updated based on the answers provided by the respondent to questions in the survey completed by the respondent. As more and more respondents complete surveys, the model(s) associated with the questions in the surveys may more accurately predict the types of responses that are likely to be provided by a particular respondent selected from the pool of market participants. New surveys may be generated based on the model(s) as more and more respondents provide answers to the surveys transmitted to the respondents. The new surveys may include different questions from the earlier surveys to collect different data about different subjects of interest to the market research analyst. In other words, the surveys may be generated dynamically based on the execution of the model, which is updated based on responses provided by the respondents.

For example, at the start of a market research project, a model may predict that half of the market participants are male and half of the market participants are female. A survey may be generated that is sent to a thousand respondents selected from the pool of market participants. Of the thousand respondents sent the survey, 250 responses are received that include answers to the questions included in the survey. The model or models may be updated to reflect that of the 250 responses received, 150 respondents indicated that they were women while 100 respondents indicated that they were men, indicating that the previous assumption of the male/female ratio within the pool of market participants may be wrong. Similarly, the model(s) may also be updated to reflect the other answers provided by the respondents and/or determine whether there is any statistical correlation between two or more questions/answers. The updated model(s) may then be used to generate one or more new surveys with different questions or a different order to the questions. For example, because the population of the market participants appears to skew more towards females than males, the survey questions may be changed to ask questions that are more statistically relevant to a female audience (e.g., questions related to shopping for clothes versus questions related to shopping for tools, etc.).

In one embodiment, model(s) and generated survey(s) may be used to allow a market research analyst to test a hypothesis. For example, in one embodiment, market research analysts may expect buyers of a certain product to be mostly male. As data is collected, a score (e.g. likelihood score, etc.) may be presented to the market research analyst(s), indicating an initial result of whether their expectation(s) was/were correct. In some embodiments, a threshold of data (e.g. a minimum of 25 individuals, etc.) must be collected before a hypothesis may be tested. In other embodiments, immediate unfiltered feedback may be presented indicating initial results of testing a hypothesis. Further, in one embodiment, if the results of testing a hypothesis are correct (i.e. the data collected correlates with expected results, etc.), the survey subject to the hypothesis testing may be used for general use (e.g. sent out to additional individuals, etc.).

In another embodiment, the set of questions included in the survey may be generated dynamically based on the model. For example, a first question in the survey may be selected to ask a respondent whether the respondent is male or female. The survey engine will then select a second question to include in the survey based on the output from the model. For example, if the respondent indicates that the respondent is female, then the survey engine will select a statistically relevant question for females, whereas if the respondent indicates that the respondent is male, then the survey engine will select a statistically relevant question for males. As the respondent continues to answer questions of the survey, the survey engine will continuously select additional questions for the survey, based on the responses previously provided within that survey as well as responses previously provided by zero or more other respondents.

More illustrative information will now be set forth regarding various optional architectures and features within which the foregoing framework may or may not be implemented, per the desires of the user. It should be strongly noted that the following information is set forth for illustrative purposes and should not be construed as limiting in any manner.

Any of the following features may be optionally incorporated with or without the exclusion of other features described.

Figure 2:
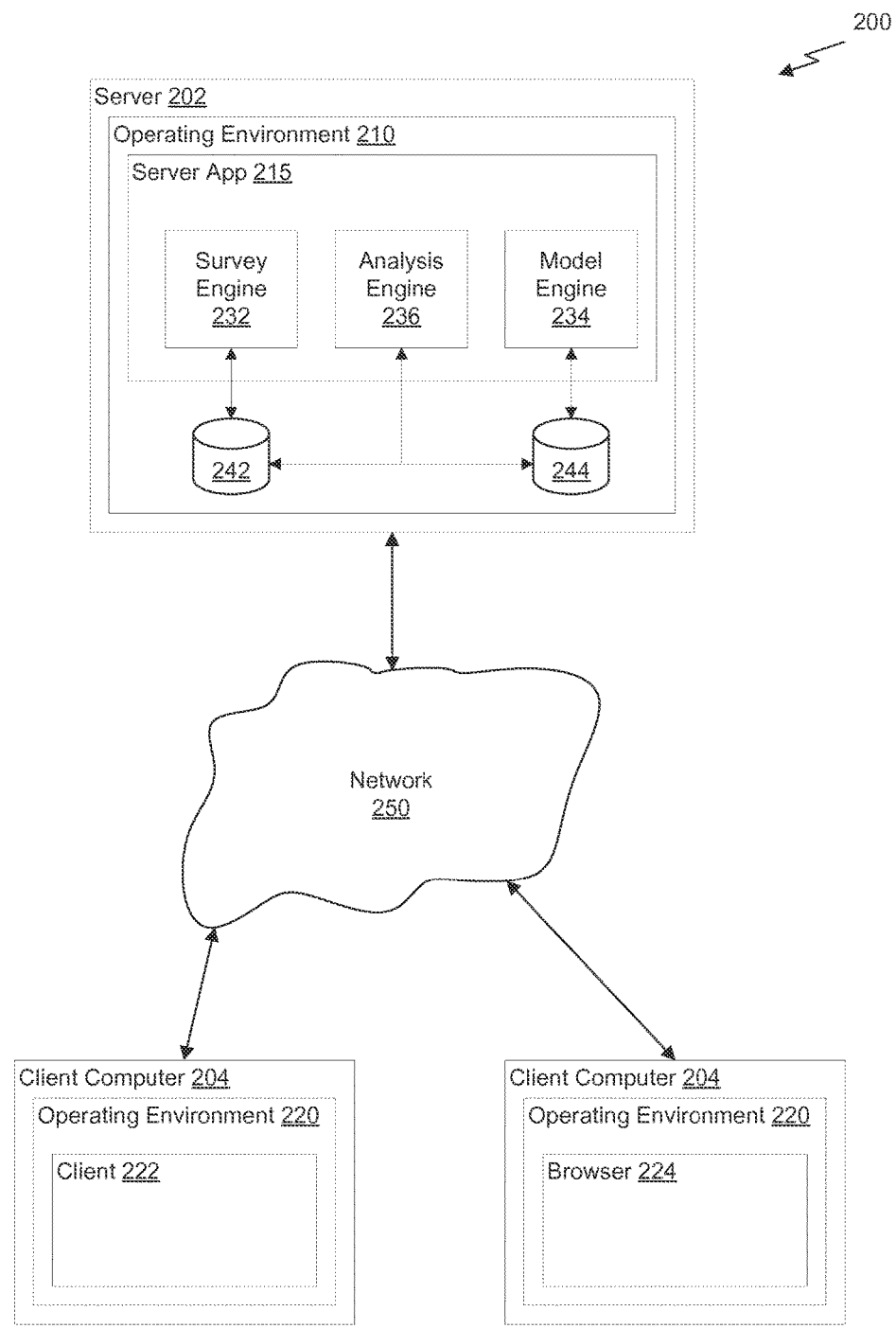
FIG. 2 illustrates a system for managing market research projects, according to one embodiment.

FIG. 2 illustrates a system 200 for managing market research projects, according to one embodiment. The system 200 includes a network environment including software configured in a client-server relationship. The network environment includes a server computer 202 connected to a network 250. In addition, one or more client computers 204 are connected to the server computer 202 via the network 250. In one embodiment, the network 250 includes a number of devices configured to communicate via the standard Internet Protocol Suite (TCP/IP). The network 250 may include a number of routers, bridges, switches, etc. connected via a number of different physical interfaces such as a fiber optic interface (e.g., SONET, etc.), a wired interface (e.g., Ethernet, etc.), or a wireless interface (e.g., Wi-Fi, Bluetooth, etc.). In one embodiment, the network 250 is the Internet. In another embodiment, the network 250 may be a private network, local area network (LAN), or the like.

The server computer 202 may include one or more processors, a volatile memory such as SDRAM, a non-volatile memory such as a hard disk drive (HDD), a solid state drive (e.g., Flash memory), an optical drive (e.g., CD-ROM, DVD-ROM, etc.), a network interface controller (NIC), a bus or other communications network, one or more input devices (e.g., a keyboard, a mouse, etc.), and/or one or more output devices (e.g., a display device, speakers, etc.). The server computer 202 may also include software, stored in the non-volatile memory and loaded into the volatile memory, such as an operating system and one or more applications. The operating system and/or one or more applications may be executed by the one or more processors of the server computer 202.

As shown in FIG. 2, the operating system, when executed by a processor, generates an operating environment 210 within which the one or more applications may be executed. The operating environment 210 may include the processes associated with each active application being executed by the processor, memory (virtual or physical) that is allocated to each process, a set of functions provided by the operating system, and so forth. The operating environment 210 includes a server application 215, which may be configured to provide a service for managing market research projects. As used herein, the service may be accessible via the network 250 by the one or more client computers 204.

In one embodiment, the server application 215 may include a number of software modules or engines that provide a specific functionality of the service. As shown in FIG. 2, the server application 215 includes a survey engine 232, an analysis engine 236, and a model engine 234. Although not shown explicitly, the server application 215 may also include an interface module that enables market analysts to access the functionality of the server application 215 via a client over the network 250 and a presentation module that generates visual representations of the survey data provided by respondents. Of course, any other modules associated with the server application and used for providing additional features of the analysis may be included as needed.

The survey engine 232 may access a survey database 242 that includes surveys, a pool of available questions and corresponding answers, response data provided by respondents, and the like. The model engine 234 may access a model database 244 that includes information associated with modeling the market and representing correlations between survey questions and/or responses. The survey database 242 and the model database 244 may be stored in a memory associated with the server computer 202. In one embodiment, the memory is a local, non-volatile memory such as a HDD or an array of HDDs. In another embodiment, the memory is a network-accessible memory such as a storage as a service (SaaS) like that provided by the Amazon® S3 web services solution. It will be appreciated that in either case, at least a portion of the database may be fetched into a local volatile memory such as SDRAM connected to the processor of the server computer 202 so the portion may be accessed by the survey engine 232 and/or model engine 234.

As also shown in FIG. 2, the analysis engine 236 may access the survey database 242 and the model database 244. For example, the analysis engine 236 may access questions in the survey database 242 to retrieve responses to completed surveys provided by one or more respondents. The analysis engine 236 may also access model data included in the model database 244 to update the model based on responses received from one or more respondents.

Each of the client computers 204 may include a central processing unit (CPU), a graphics processing unit (GPU), a volatile memory, a non-volatile memory, a NIC, one or more input devices, and/or one or more output devices. The client computers 204 may also include software such as an operating system and one or more applications. Similar to the server computer 202, the operating system, when executed by a processor, generates an operating environment 220 within which the one or more applications may be executed.

As shown in FIG. 2, in one embodiment, one of the applications may include a browser application 224 for accessing and viewing information accessible over the network 250. For example, the browser application may be configured to transmit HTTP requests to the server application 215 executed by the server computer 202. The server application 215 may transmit HTTP responses to the browser application 224 on the client computer 204. The HTTP responses may include markup language documents such as HTML documents or XML documents that may be formatted to be displayed in a window of the browser application 224. The browser application 224 may be configured as a thin client, such as a portal accessible by a web browser, to be used to access the functionality of the server application 215 remotely. In other words, the portal comprises one or more markup language documents that are served to the client computer 204 and displayed in the browser application 224 in a window on the display device of the client computer 204. The markup language documents may include an interface, such as a form, that enables a user to input information and call the functions of the server application executed on the server computer 202 from the browser application 224 of the client computer 204.

In another embodiment, one of the applications may include a client application 222. The client application 222 may be embodied in a standard binary executable that is executed within the operating environment 220 provided by the operating system of the client computer 204. The client application 222 may include a graphical user interface (GUI) that includes a number of input elements (e.g., text boxes, buttons, menu items, etc.) and/or output elements (e.g., images, text, etc.), referred to herein as user interface (UI) elements. The UI elements may be configured to enable a user to input information and call the functions of the server application executed on the server computer 202 from the client application 222.

The client application 222 or the browser application 224 (hereinafter, generally referred to as the "client") may be configured to call functions of the server application 215 via an application programming interface (API). The API may define function calls that enable a market analyst, via the client, to access functions provided by the server application 215, such as creating survey questions, generating new surveys, managing a market research project, viewing the data associated with responses provided by a number of respondents, and so forth.

Figure 3:
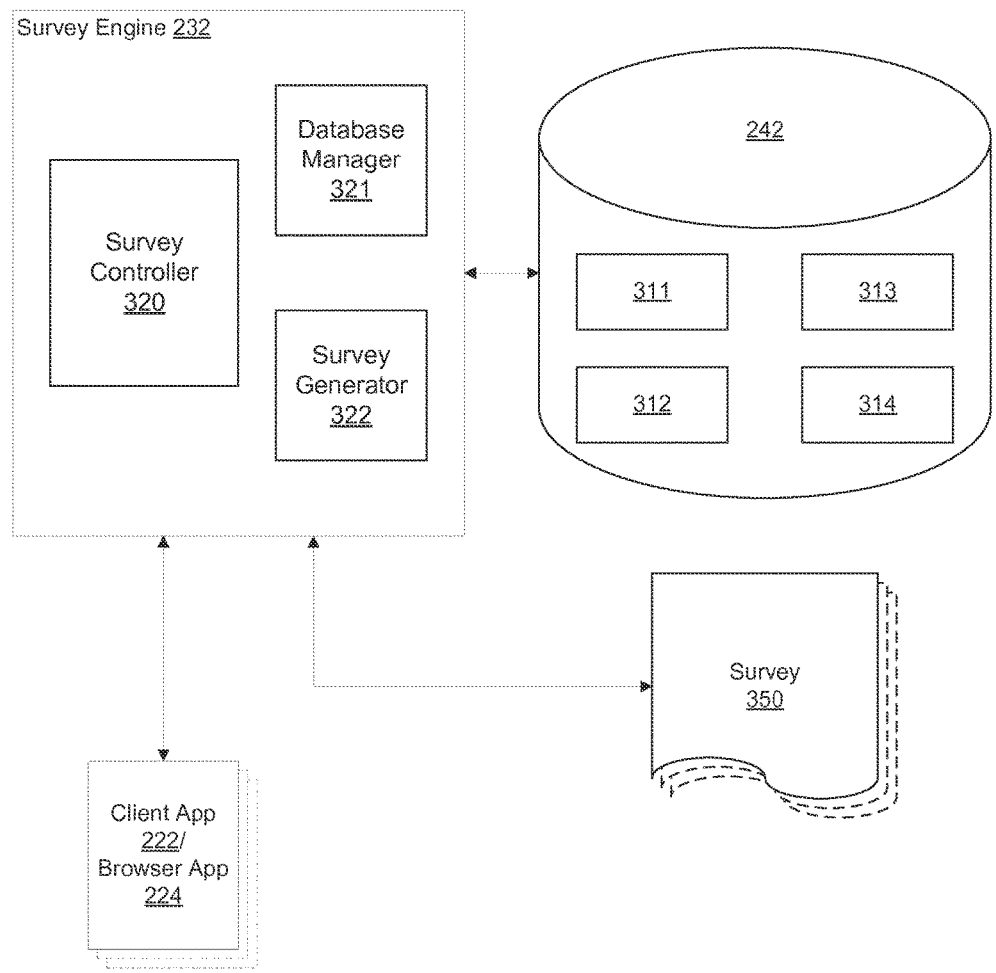
FIG. 3 illustrates the operation of the survey engine of FIG. 2, in accordance with one embodiment.

FIG. 3 illustrates the operation of the survey engine 232 of FIG. 2, in accordance with one embodiment. The survey engine 232 enables a dataset to be created, stored, and managed by a market research analyst as well as facilitating completion of surveys by respondents. A dataset may be associated with a market research project and includes all information about the survey questions asked to respondents, the answers to the questions submitted by respondents, and demographics data about the respondents. In one embodiment, the dataset may include (1) Question Family data; (2) Question data; (3) Respondent data; (4) Filter data; and/or (5) Survey Response data. Of course, in other embodiments, any type of data may be associated with a dataset.

The dataset may be stored in the survey database 242. In one embodiment, each of the different types of data may be stored in a different table of a relational database. For example, question family data may be stored in a first table of the relational database, question data may be stored in a second table of the relational database, respondent data may be stored in a third table of the relational database, filter data may be stored in a fourth table of the relational database, and survey response data may be stored in a fifth table of the relational database. In another embodiment, the dataset may be stored in one or more databases. For example, the question family data and question data may be stored in one database, the respondent data and filter data may be stored in another database, and the survey response data may be stored in yet another database.

A "Question Family", as the term is used herein, may refer to a set of related questions. An entry in the dataset may include an identifier for the question family, a descriptive name for a question family, and a type of the question family. In one embodiment, the valid types of questions may be: (1) Answer Questions; (2) Descriptive Questions; and (3) Weight Questions. Descriptive questions may include questions that describe demographic data about the respondent, such as the respondent's gender, age, or location. Weight questions may include questions that request an answer to the question in the form of a numeric response and can be used to weigh a respondent's answers. For example, a question may ask a respondent to specify whether they like or dislike a particular product on a scale of 1 to 5. Answer questions may include all questions that do not fall into the descriptive or weight categories. For example, an answer question can be phrased as "Have you purchased a lawn mower in the last 6 months: Yes or No?" The specific question types described above are provided as illustrative and should not be construed as limiting in any way. Other classifications of question types are contemplated as being within the scope of the present disclosure. In some embodiments, the types of questions included in the survey may be defined by the market research analyst.

A "Question", as the term is used herein, may refer to a definition of a question to be included in a survey. An entry in the dataset may include an identifier for the question, the text associated with the question (i.e., the prompt to be displayed on screen to the respondent while the respondent is participating in the survey), an identifier of the question family the question is included in (if any), and a set of valid answers to the question. For example, a question may be defined as Qn_1, associated with the text of "What is your ethnicity?", included in the QF_1 question family, and have valid answers specified as: "Caucasian/White"; "Hispanic/Latino"; "Asian/Pacific Islander"; "African-American/Black"; and "Other".

Questions may have answers ranging from a selection of a set of valid answers, an unbounded numeric response, or a numeric response limited to a specific scale. In some embodiments, questions may also allow an unbounded answer to be entered by a respondent. For example, a respondent could type an answer into a text box. Such answers may have a wide range of possible answers given the text entered by the user is not limited to a specific set of choices. Examples of the types of answers provided are: a number from 1 to 99 in response to the question "What is your age?"; a number from 1 to 10 in response to the question "On a scale of 1 to 10, how much do you enjoy the taste of pepperoni on your pizza?"; and a selection of an ethnicity type from a list such as the list set forth above. In one embodiment, the valid answers may be provided to the respondent in a multiple choice format and the respondent is prompted to choose the correct answer from the list of available valid answers. In another embodiment, the valid answers may specify a test to determine whether an answer provided by the respondent is valid. For example, valid answers may be specified as any number between 1 and 100. Any answer provided by the respondent will then be checked to make sure the answer is a number between 1 and 100.

A "Respondent", as the term is used herein, may be an individual that completes a survey within a population targeted by the market research project. In other words, a set of respondents represent a sample of the population. The dataset may include an entry for each respondent that has previously opted-in to participate in a market research project. The entry in the dataset may include a name of the respondent, a gender of the respondent, contact information for the respondent, a username/password for the respondent to login to a portal for completing surveys, and so forth. Additionally, information associated with a respondent may include a unique identifier which may persist across two or more surveys and/or databases. In one embodiment, such an identifier may allow a market research analyst to track an individual's responses across a range of different surveys and data sources.

A "Filter", as the term is used herein, may refer to a filter that is applied to select a subset of data from the dataset. For example, a filter may be defined that selects all respondent data associated with Male respondents or all respondent data associated with respondents aged 19-35. Such filters may be defined in the dataset as simple text in any valid format. For example, a filter may be defined as a SQL (structured query language) query of the dataset included in the survey database 242. Filters may be combined by a particular analyst to reduce the amount of data being analyzed after one or more surveys have been completed by a set of respondents.

In one embodiment, the dataset may also include survey response data. Survey response data may correspond to the answers selected by the respondents to the questions included in a survey. Each entry associated with the survey response data may include an identifier of the question that was answered, an identifier of the respondent that answered the question, and the respondent's provided answer to the question.

In one embodiment, the survey engine 232 enables the dataset to be created by the market research analyst. When a market research analyst wants to start a market research project, the market research analyst may access the server application 215 via the client. The market analyst may then create at least a portion of the survey database 242 for the market research project by entering data into the client. For example, the market research analyst may populate the different tables in the survey database 242, such as a question family table 311, a question table 312, a respondent table 313, and a filter table 314, with the appropriate entries.

The survey engine 232 includes a number of different components. In one embodiment, the survey engine 232 includes a survey controller 320, a database manager 321, and a survey generator 322. The survey controller 320 facilitates communication with the client. The survey controller 320 receives requests from the client to, e.g., create a new market research project. The survey controller 320 may process the request and transmit a request to the database manager 321 to create a new database in a memory associated with the server computer 202. The database manager 321 may create the database, such as the survey database 242, in the memory. The market research analyst, via the client, may then add data to the database by entering information into fields in the client and transmitting the information to the survey controller 320 and the database manager 321 to add an entry to one of the tables in the database. For example, the market research analyst may utilize a form displayed in the client to enter information related to questions that the market research analyst would like to include in the surveys. When the information has been entered the market research analyst submits the form on the client, which is then transmitted to the survey controller 320 via an HTTP request. The survey controller 320 parses the HTTP request and transmits a request to the database manager to add an entry to the question table 312 in the database.

In one embodiment, the server application 215 may also access additional data stores to import information into the newly created database. For example, the server application 215 may have access to a list of respondents that have previously opted-in to participate in market research. The market research analyst may select a subset of respondents from the list of respondents to import into the respondents table 313 of the survey database 242. In one embodiment, the market research analyst may apply a filter to the list of respondents to select the respondents to include in the respondents table 313 of the survey database 242, such as selecting all respondents in a particular state.

The server application 215 may also have access to a question dictionary that includes a listing of questions used in other market research projects. Market research analysts that have created questions as part of other market research projects may save questions they have created within their particular market research project to the question dictionary to be accessed and shared with other market research analysts. These standard questions may enable faster creation of surveys by allowing a market research analyst to quickly select a group of questions rather than requiring all questions to be re-entered. In one embodiment, the server application 215 may access both a standard question dictionary shared by all market research analysts and a private question dictionary that can only be accessed by that particular market research analyst. In other words, the private question dictionary includes questions previously saved by that market research analyst as a part of other market research projects, but not shared with other market research analysts.

Once the market research analyst has populated the survey database 242, the market research analyst may create one or more surveys 350. Each survey 350 includes a plurality of questions stored in the question table 312 of the survey database 242. In one embodiment, the surveys 350 are manually created by the market research analyst by selecting a set of questions to include in the survey 350 and determining an order for the questions in the survey. In another embodiment, as described in more detail below, the surveys 350 may be automatically created based on a model.

The market research analyst may create a survey 350 by selecting the questions to include in the survey 350 using a form displayed by the client. The market research analyst may add each question to a list in a specific order and then submit the ordered list of questions to the survey engine 232 via an HTTP request. The survey controller 320 may parse the HTTP request and transmit a request to the survey generator 322 to create a new survey. The survey generator 322 may then create a survey 350 and store the survey 350 in a memory associated with the server computer 202. In one embodiment, the survey 350 includes an ordered list of pointers to the questions in the survey database 242. The survey 350 may also include metadata such as a list of respondents that the survey 350 is distributed to, an author of the survey 350, and an identifier to uniquely identify the survey 350.

In one embodiment, the survey 350 may include questions that are conditionally included in the survey 350 based on responses provided by the respondent. In other words, the contents of the survey 350 may be dynamic based on the responses provided by the respondent. In one technique, each question in the survey may be optionally associated with a condition(s) that determines whether a question in the survey 350 will be displayed to a respondent. For example, a first question may ask whether the respondent is male or female. Based on the respondent's answer to the first question, a second question will optionally be displayed. For example, a question based on how many hours a week the respondent watches live sporting events may only be displayed if the respondent answered the first question with "male". The conditions may be specified as a Boolean test that compares the response provided by the respondent to a specific question to a target response. If a question is not displayed to the respondent, then an answer to that question will not be included in the response data submitted by the respondent when they have completed the survey.

The survey controller 320 also manages the administration of the surveys 350 to the respondents. In one embodiment, the market research analyst may specify a subset of respondents to whom the survey 350 should be submitted. The market research analyst may select each of the respondents individually from a list of all respondents. Alternatively, the market research analyst may select the respondents by applying a filter to the list of all respondents. Finally, the market research analyst may specify a total number of respondents to submit the survey to and the survey controller 350 may randomly select the total number of respondents from the list of all respondents. Once the subset of respondents has been selected, the survey controller 320 may facilitate notification to each of the respondents in the subset of respondents that the survey 350 is available. The survey controller 320 may cause a message, such as an email, a text message, or a recorded voice message, to be sent to each respondent at either the respondent's email address or phone number. In another embodiment, the message may be associated with a portal accessible by the respondent on the web. When the respondent logs into the portal, the message may be accessed. For example, the portal may include an electronic mail aspect that includes the message. Alternatively, the portal may simply display the message within one of the elements of the portal, such as text within a <p> element at the top of a markup language document.

In one embodiment, the message may include a link, such as a URL (uniform resource locator), that the respondent can click to open an interface in a browser application 224 in order to complete the survey 350. The interface may be associated with a portal or web page(s) that enable the respondent(s) to complete surveys 350. The browser application 224 generates an HTTP request associated with the link that is transmitted to the survey controller 320. The survey controller 320 may return a markup language document to the browser application 224 that includes an interface that enables the respondent to enter the respondent's identification information. The identification information may be a username and password previously associated with a particular respondent. The respondent may enter their username and password in the interface and submit the information to a specific URL in an HTTP request transmitted back to the survey controller 320. The URL may have a specific route that is associated with a specific market research project. The survey controller 320 may authenticate the respondent using the provided username and password. Once the survey controller 320 has authenticated the respondent, the survey controller 320 may check an active survey list associated with the market research project. If there are no available surveys in the active survey list, then the survey controller 320 may return an HTTP response to the browser application 224 that includes a message indicating there are no surveys available to be completed by the respondent. However, if at least one survey is included in the active survey list, then the survey controller 320 may return an HTTP response to the browser application 224 that includes an interface for completing a survey selected from the active survey list.

The interface may include a form that displays at least one question included in the selected survey and at least one element enabling the respondent to submit an answer to the question. In one embodiment, the HTTP response includes a markup language document that includes a question and, optionally, a list of one or more potential answers that are displayed as text that is visible to the respondent and a form for submitting an answer to the question. When the respondent submits the form with the respondent's answer to the question, the browser application 224 generates a new HTTP request that includes the form data and transmits the HTTP request to the survey controller 320. The survey controller 320 parses the HTTP request to identify the respondent's answer to the question. The respondent's answer may be checked to make sure the answer is a valid answer. If the answer is a valid answer, then the survey controller 320 transmits the answer to the database manager 321 to store the answer in the survey response table of the survey database 242 (or in a separate database for storing survey response data). The survey controller 320 may then transmit an HTTP response that includes a markup language document including a next question in the survey 350. This process is repeated until all questions in the survey 350 have been completed by the respondent. Once the survey 350 is complete, the survey controller 320 may transmit an HTTP response to the client that includes a message thanking the respondent for completing the survey 350. Although the HTTP responses described above only include a single question, multiple questions may be included in each markup language document such that each HTTP request transmitted by the client includes answers to more than one question answered by the respondent, thereby requiring fewer messages to be transmitted between the client and server to complete the survey 350.

In one embodiment, the survey controller 320 may be configured to enable a respondent to partially complete a survey 350, log out of the portal, and login to the portal at a later time to complete the survey 350. The survey controller 320 may store a pointer to a current question in the survey 350 that indicates a location (i.e., question number) that the respondent has reached in the survey 350. When the respondent enters their login information in the portal, the survey controller 320 may check to see if there are any partially completed surveys 350 in the active survey list. If there is at least one partially completed survey 350, then the survey controller 320 may prompt the respondent to complete the survey 350. If the respondent wishes to complete the survey 350, then the survey controller 320 may determine the next question to be displayed to the respondent based on the pointer. Administration of the survey 350 will then continue as if the respondent had never stopped taking the survey 350. Additional information may also be stored when a respondent partially completes a survey 350, such as a total number of questions already completed, a total time elapsed since the survey 350 was started, etc., and such information may be utilized when completing the survey 350.

In this manner, the survey controller 320 may help facilitate administration of the surveys 350 to one or more respondents. As more and more respondents complete the survey 350, the market research analyst will be able to analyze the data. The market research analyst may also create additional surveys 350 as part of the market research project in order to gain more insight into the market. In addition, as will be described in more detail below, after each survey 350 is completed by a respondent, the survey controller 320 may transmit a request to the analysis engine 236 in order to analyze the respondent's answers to the survey 350 and update one or more models associated with the market research project.

In another embodiment, the survey controller 320 provides an interface for receiving response data generated by a third party application. For example, the survey controller 320 may generate surveys 350 that are exported to the third party application. The third party application may facilitate the administration of the survey to the respondent(s). The response data received from the respondent(s) may then be transmitted from the third party application to the survey controller 320. In one embodiment, the third party application may be a custom application installed on a computing device, such as a cell-phone of a respondent. The custom application may enable the respondent to easily complete the survey via their computing device. Of course, in other embodiments, the survey may be integrated into any third-party application, and/or modified such that one or more features associated with the survey may be accessed via a third-party application.

In one embodiment, resources associated with the model and/or survey system may be provided via an API. In such an embodiment, a third party application and/or resource and/or service may have a separate platform system, but may use the API to leverage one or more features associated with the model and/or survey system. In this manner, the model and/or survey system may function as a separate product to be integrated into other third party platforms and/or systems. Further, in one embodiment, any resource (e.g. engine, controller, etc.) associated with the model and/or survey system may be made available via an API. Of course, in other embodiments, any combination of third party resources and resources associated with the model and/or survey system may occur in any manner.

Figure 4:
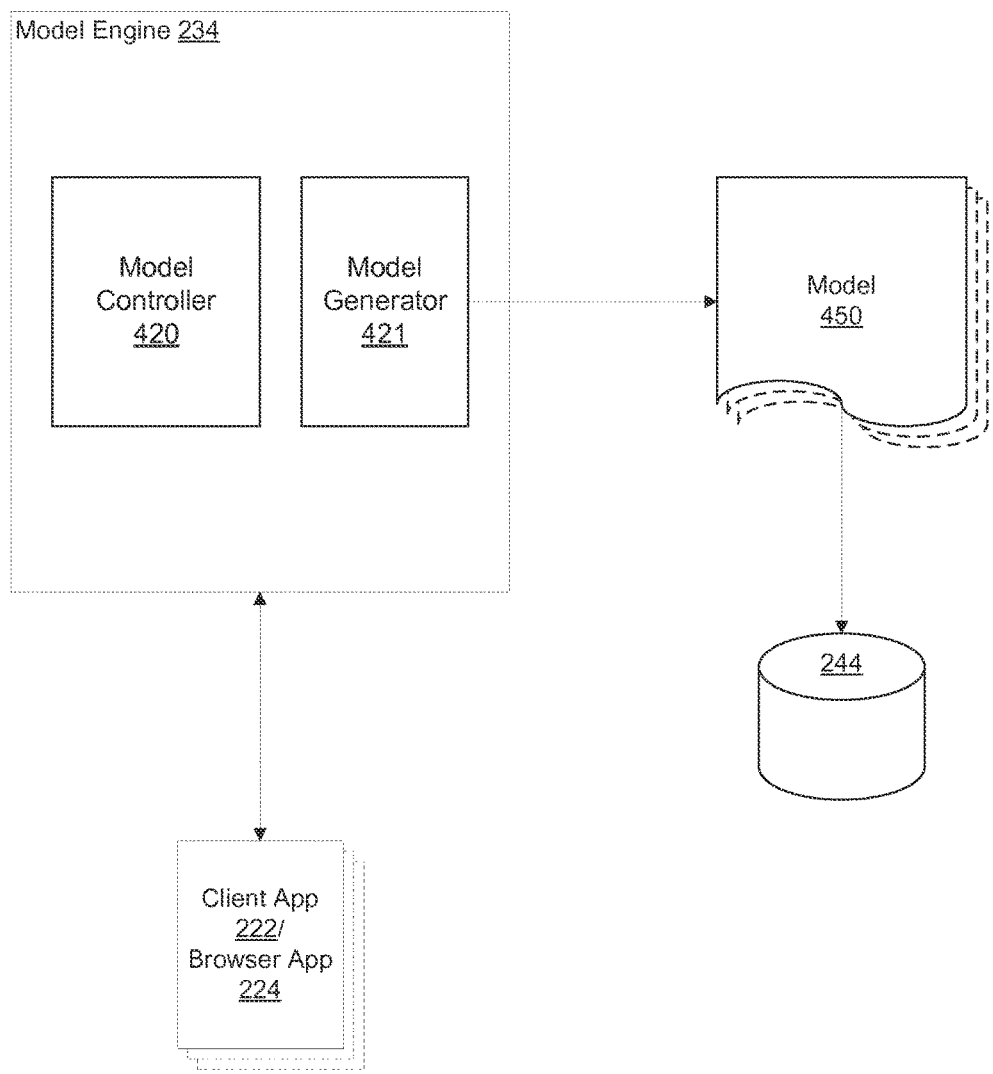
FIG. 4 illustrates the operation of the model engine of FIG. 2, in accordance with one embodiment.

FIG. 4 illustrates the operation of the model engine 234 of FIG. 2, in accordance with one embodiment. The model engine 234 enables a market research analyst to generate models for predicting answers provided by respondents to a particular question. In other words, model(s) may be run to predict the probability of a respondent to provide a specific answer to a particular question within a given population. As described in more detail below, the model(s) may be run by the analysis engine 236 to determine whether a particular question should be included in a survey by estimating whether an expected answer submitted by a particular respondent would result in a statistically relevant datapoint. For example, in one embodiment, the model may determine that 90% of respondents that are female and have children shop for groceries at least one time per week. The model may also predict that the 90% response rate is statistically relevant after at least 50 respondents in the population have submitted an answer to the question. Thus, based on the model, a survey may not include a question about how often the respondent shops for groceries if the respondent is female and has children after at least 50 respondents have answered said question. Additionally, in one embodiment, if a question is predicted by other questions, then it may be removed unless it is used to predict the responses to the other questions. For example, in one embodiment, if the respondent is female and has children, then the model may return that the respondent is very likely to shop for groceries once a week. However, in such an embodiment, the question focused on grocery shopping may only be removed if it isn't used to predict other questions (e.g. the type of grocery produce the individual purchases weekly, etc.). In this manner, therefore, questions presented may be filtered and/or removed if it not used to predict responses to one or more other questions.

In one embodiment, the prediction may be generated by calculating a relationship between the target question and a target response with other data associated with the same survey, different surveys, or other data. In other words, a relationship may refer to a correlation between a particular answer to a target question and (1) an answer to another question by the same respondent in the same survey; (2) an answer to another question by a different respondent or respondents to the same survey or different surveys; or (3) other data that is unrelated to questions in a survey (e.g., purchase data for a specific store, website usage, etc.). The analysis engine 236 may reduce "data ignorance" about a target question/response by finding such correlations such that each target question and target response is not an isolated data point. By performing the analysis repeatedly as new responses are received, the analysis engine 236 will generate a set of predictions for a target question. In another embodiment, the analysis engine 236 may analyze a predefined model or a predefined set of relationships in order to test the validity, relevance, or accuracy of the predefined model. The predefined model may be analyzed via a set of question specific coefficients that are used to weight the responses provided to the question by one or more respondents in order to calculate the accuracy of the predefined model.

A model may refer to a set of calculations or computations based on the survey response data, one or more additional datasets such as behavioral data, and model parameters specified for the model. In one embodiment, the model parameters may be stored in a data structure that stores information needed by the analysis engine 236 to run the model. Each model data structure 450 may be associated with a particular model and each model may correspond with a particular question included in the survey database 242. Once a market research analyst has created a new question and added the question to the survey database 242, the market research analyst may be prompted to specify the model parameters for the question. Consequently, a plurality of models data structures 450 may be associated with a particular survey 350 corresponding to a plurality of models to be run by the analysis engine 236. In another embodiment, a model data structure 450 may be associated with a particular survey 350 such that the model data structure 450 contains model parameters related to a plurality of the questions included in the survey 350. In yet another embodiment, a model data structure 450 may be associated with a particular market research project such that the model data structure 450 contains model parameters related to a plurality of questions included in all of the surveys 350 associated with the market research project.

In one embodiment, a market research analyst may generate a model data structure 450 using an interface displayed by the client. The market research analyst may enter the information for the model data structure 450 in one or more fields of the interface and submit the information to the server application 215 via an HTTP request. The model controller 420 in the model engine 234 may be configured to parse the HTTP request to retrieve the information for the model data structure 450. The information may be transmitted to a model generator 421 that is configured to format the data structure for the model data structure 450 to include the information provided by the market research analyst and store the model data structure 450 in the model database 244. The model controller 420 may transmit an HTTP response to the client that informs the market research analyst whether the creation of the model data structure 450 was a success or a failure. The market research analyst may use the interface to create a plurality of model data structures 450 corresponding to a plurality of the questions included in the surveys 350.

Each model data structure 450 includes a number of parameters that enable the analysis engine 236 to run a model. In one embodiment, the parameters include a survey identifier, a question identifier, a target response, an accuracy threshold, a computation method, and stopping criteria. The survey identifier may be a key that specifies a particular survey 350 in the survey database 242. The question identifier may be a key that specifies a particular question in the identified survey 350. The target response identifies a particular response to the question for which a prediction is to be calculated. The target response may be an identifier of one of the valid answers associated with the question. Alternately, the target response may be a range of values that match two or more valid answers to the question. For example, the target response could be a range of 1-3 on a scale of 1-10 or the target response could be a range of 18-35 in response to a question related to the respondent's age. The accuracy threshold identifies a minimum level of accuracy at which the prediction generated based on the model is assumed to be correct. Typically, the accuracy threshold is related to a number of respondents that have submitted an answer to the question. The computation method enables the market research analyst to select the particular algorithm used to make the prediction. The available algorithms may be hardcoded into the model engine 234. Alternately, the market analyst may specify a new algorithm by selecting a file including source code implementing the algorithm or selecting a file including a binary executable that implements the algorithm. Finally, the stopping criteria may specify one or more actions to be taken when a prediction generated by the model meets or exceeds the accuracy threshold.

Although the model data structure 450 may include parameters associated with a single question, in other embodiments, the model data structure 450 may include parameters associated with a plurality of questions. For example, the question identifier could be modified to include an array of question identifiers for multiple questions within a survey 350 and the target response could be modified to include an array of identifiers for responses to the questions identified within the array of question identifiers. In other embodiments, the model data structure 450 may include parameters related to every question in a particular survey 350. In yet other embodiments, the model data structure 450 may include parameters related to every question associated with a plurality of surveys 350 in a market research project. It will be appreciated that the list of parameters provided above is illustrative and not exhaustive. In some embodiments, the model data structure 450 may not include one or more parameters described above. Furthermore, one or more additional parameters may be included in lieu of, or in addition to, the parameters described above.

Figure 5:
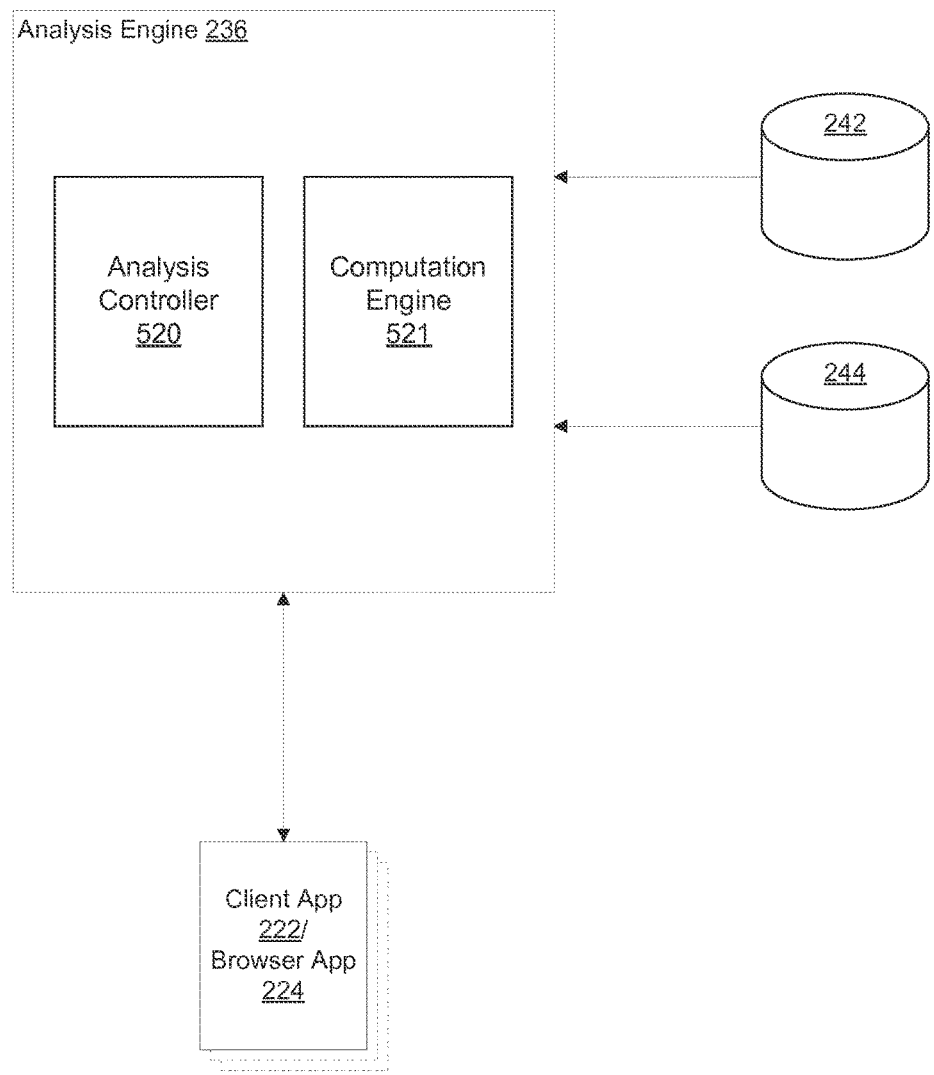
FIG. 5 illustrates the operation of the analysis engine of FIG. 2, in accordance with one embodiment.

FIG. 5 illustrates the operation of the analysis engine 236 of FIG. 2, in accordance with one embodiment. The analysis engine 236 is configured to generate predictions related to each target response to a target question specified by the model data structure 450. The analysis engine 236 may access the survey database 242, including survey response data for one or more surveys 350 provided by one or more respondents, as well as the model database 244, including one or more model data structures 450.

In one embodiment, the survey controller 320 may be configured to transmit a message to the analysis controller 520 whenever a respondent completes a survey 350. The message may cause the analysis controller 520 to run a model or models related to one or more questions in the survey 350. In one embodiment, the analysis engine 236 maintains an active model list, which is a file that includes a list of model(s) that should be executed after a survey is completed. Each model may generate an output related to a question specified by the corresponding model data structure 450. A different active model list may be maintained for each survey 350 included in the market research project. The active model list(s) may be managed manually by the market research analyst. An interface displayed in the client may be used to modify the active model list for a given survey 350. By submitting a form via the client, the server application 215 may store a file including the active model list in a memory associated with the server computer 202.

In response to receiving the message from the survey controller 320, the analysis controller 520 may read the active model list and configure the computation engine 521 to run a model for each model data structure 450 included in the active model list. For a particular model data structure 450 included in the active model list, the analysis controller 520 may configure the computation engine 521 to execute an algorithm specified by the computation method parameter in the corresponding model data structure 450. The computation engine 521 may then run the model, at least in part, by executing the algorithm to generate a prediction, based on the response data provided by one or more respondents to the question specified by the corresponding model data structure 450. The computation engine 521 may also utilize other data to generate the output of the model. In one embodiment, the computation engine 521 is configured to serially run models for each model in the active model list. In another embodiment, the computation engine 521 may be configured to run two or more models in parallel.

In yet another embodiment, the analysis controller 520 may generate a model dynamically. For example, based on previous analysis performed by other models, the analysis controller 520 may change aspects of how a model works, excluding basic components of the model, adding basic components of the model, or replacing certain components in a model with other components in a model. Even though the components of the model may change, the computation method used to calculate various variables (e.g., mutual information entropy, correlation measurements, etc.) may stay the same.

In one embodiment, a model may not be accurate until a certain amount of response data for a question has been received and stored in the survey database 242. Thus, the analysis controller 520 may be configured to only run the model for a question if there is a threshold number of responses to a question stored in the survey database 242. In another embodiment, a "soft launch" of a survey may be performed where a survey is sent to a small number of respondents to be completed. The model(s) may not be run when the response data is received from these surveys. Instead, the response data provides an initial set of response data on which the models are based, in order for the models to provide more accurate results when initially run.

In one embodiment, the analysis controller 520 is configured to recognize predictive patterns in the responses to questions provided by one or more respondents. For each model data structure 450 in the active model list, the analysis controller 520 may generate an output file that includes the prediction generated by the model. For example, the output file may include correlation measurements for each question in a survey 350 with one or more other questions, in that survey 350 or other surveys 350, as well as correlation measurements between that question and any additional data. The output file may be viewed by the market research analyst using the client. The analysis controller 520 may also transmit a message to the survey controller 320 that indicates whether the generated prediction met or exceeded the accuracy threshold parameter specified in the corresponding model data structure 450. If the generated prediction met or exceeded the accuracy threshold parameter, then the analysis controller 520 may cause the one or more actions specified by the stopping criteria parameter to be executed. In one embodiment, the stopping criteria may specify that the survey controller 320 should deactivate the current survey 350, activate a new survey 350, or remove/replace one or more questions from the current survey 350.

In one embodiment, the analysis engine 236 may receive data from one or more sources, including responses in a current survey 350, responses to other surveys 350, and or data from additional databases, such as data related to purchase transactions. The analysis engine 236 may then process each model, either sequentially or in parallel depending on available server-side resources, to analyze the data and generate a prediction for each target question associated with a model data structure 450 in the active model list. Inputs to the analysis (i.e., model), in addition to the received data, may be utilized within the model to generate the prediction and may be included in a corresponding model data structure 450, hard-coded into the analysis engine 236, or retrieved by the analysis engine 236 from some other storage location associated with the server computer 202. The inputs may include, at a minimum, a target question and target response associated with the model. The inputs may also include an accuracy threshold parameter, a predefined order for selecting variables to be applied within the model, a set of variables to be excluded from the model, a computation method, etc. As used herein, a variable may refer to a question and corresponding answer provided by one or more respondents.

For each model, the analysis engine 236 produces a prediction, which may refer to a set of mutually exclusive conditions that predict the responses provided by respondents to the target question. For example, the mutually exclusive conditions may include a condition that if a respondent answers a first question with a first response, then the predicted response to the target question is likely to be X, at a predicted rate of P. The output of the analysis engine 236 may be a file that lists all of the mutually exclusive conditions for the corresponding target question and target response. The output may be displayed to the market research analyst via one of several methods. In one embodiment, the set of mutually exclusive conditions may be listed as a set of conditions and an associated predictive power (i.e., accuracy) for each condition. In other words, the condition may be a set of responses to one or more questions in the survey and the associated predictive power may be the predicted percentage of the time that a respondent will answer the target question with the target response given that the respondent's responses to the other questions meet the condition.

In another embodiment, the set of mutually exclusive conditions may be displayed as a histogram where a first axis of the histogram is a group defined by a set of conditions and a second axis of the histogram is defined as the size of the group. In yet another embodiment, the set of mutually exclusive conditions may also be displayed according to the impact of individual questions to the mutual information entropy. In one embodiment, the mutual information entropy may be defined as Shannon Entropy from Claude E. Shannon's paper titled "A Mathematical Theory of Communication", the entire contents of which is incorporated herein by reference in its entirety. In other words, the display may list particular questions that have the largest effect on the calculated mutual information entropy associated with the target question and target response. The latter visualization may be easier to interpret than looking at individual conditions. Of course, it is recognized that other methods and/or techniques (e.g. in addition to information entropy and/or data ignorance, etc.) may be used to select a variable to predict a response.

In one embodiment, to create the prediction, the analysis engine 236 may analyze the received data to find the variable that explains the largest change in entropy for a given target question. The analysis may be performed according to a "data ignorance minimization" algorithm. The algorithm is a recursive process that identifies chains of conditions that are associated with the largest mutual information entropy for predicting a given response, t, to a target question, $Q\_T$. The algorithm, as executed by the analysis engine 236, begins by calculating the mutual information entropy for each of the valid questions in the survey 350. Valid questions may include any questions in the survey 350 that are not explicitly excluded based on parameters specified for the model by the market research analyst or any questions for which there is more than one response from all respondents (i.e., questions for which all respondents answer the same way do not have effects on other questions that can be analyzed, and are therefore invalid). Then, the analysis engine 236 selects the valid question in the survey 350 that is associated with the largest calculated mutual information entropy. The selected question, and response, becomes the first question in the chain of conditions. The analysis engine 236 creates a set of n chains of conditions, where n is the number of different possible responses to the selected question. For example, if $Q\_1$ is the first question in the chain and there are two possible responses to $Q\_1$ (e.g., "yes"=1, "no"=2, etc.), then the analysis engine 236 will create two chains of conditions, a first chain including condition $Q\_1=1$ and a second chain including condition $Q\_1=2$.

Then, each chain of conditions is checked to determine a total number of respondents associated with each chain. For a particular chain, the analysis engine 236 may filter the response data by the conditions in the chain. For example, for the first chain including the first condition $Q\_1=1$, the response data may be filtered to generate a working set of response data that includes all surveys 350 for which a respondent answered $Q\_1$ with the response 1 (i.e., "yes"). In other words, response data for respondents that answered $Q\_1$ with an answer other than 1 are excluded from the working set of response data. Then the total number of respondents that answered $Q\_1$ with 1 is determined. If the total number of respondents is greater than or equal to a threshold level, then the chain will continue to be parsed (i.e., conditions will be added to the chain of conditions and new chains will be formed). However, if the total number of respondents is less than the threshold level, then the chain will not be parsed any further (i.e., no more chains will be spawned from the chain and the chain of conditions will be added to the output for the model).

For a particular chain of conditions created during a previous iteration of the algorithm, the analysis engine 236 calculates the mutual information entropy for each of the valid questions included in the working set of response data. The analysis engine 236 selects the valid question in the survey 350 that is associated with the largest calculated mutual information entropy within the working set of response data. Then, the analysis engine 236 creates a set of n new chains of conditions to replace the current chain, where n is the number of different possible responses to the selected question. For example, for the first chain of conditions including condition $Q\_1=1$, if $Q\_2$ is the selected question and there are four possible responses to $Q\_2$ (e.g., "White/Caucasian"=1, "Asian/Pacific Islander"=2, "Black/African American"=3, "Latino/Hispanic"=4, etc.), then the analysis engine 236 will create four chains of conditions, a first chain including conditions $Q\_1=1$ and $Q\_2=1$, a second chain including conditions $Q\_1=1$ and $Q\_2=2$, a third chain including conditions $Q\_1=1$ and $Q\_2=3$, and a fourth chain including conditions $Q\_1=1$ and $Q\_2=4$. These new chains will replace the current chain being processed in a set of valid chains.

The process is repeated for each chain produced during the previous iteration of the algorithm that is associated with a total number of respondents that is greater than or equal to the threshold level. Once all new chains have been created during the current iteration of the algorithm, the total number of respondents associated with each chain of conditions may be checked, and the process may be repeated for any chains that are associated with a total number of respondents that is greater than or equal to the threshold level. Once a sufficient number of iterations has been performed such that all valid chains of conditions are associated with a total number of respondents is less than the threshold level, then the output may be produced that includes all of the valid chains. Alternatively, the parsing of the chains may be terminated once a particular chain of conditions reaches a predetermined length (i.e., includes a pre-determined number of conditions), regardless of how many total number of respondents is associated with a particular chain of conditions. For example, the analysis may stop once chains of conditions of length three have been reached.

The output of the model may include a list of valid chains created by the analysis engine 236 and a probability of receiving a particular answer to the target question Q_T from a respondent given the set of conditions specified by the particular chain. It will be appreciated that the algorithm described above is only one technique for generating a prediction based on a model and that other types of algorithms are contemplated as being within the scope of the present disclosure. In one embodiment, the analysis engine 236 may generate a prediction that includes a percentage of respondents that has provided a particular response to the target question. The percentage may be calculated based on a count of the total number of respondents that answered the target question and a count of the number of respondents that provided the particular response. However, such prediction does not provide much insight into the response data for the market research analyst. In another embodiment, the analysis engine 236 may simply calculate a correlation measurement for each response to a valid question in the survey 350 in relation to a particular response to the target question. The measurements may indicate relationships between any two answers in the survey 350.

Presentation Module

Figure 6:
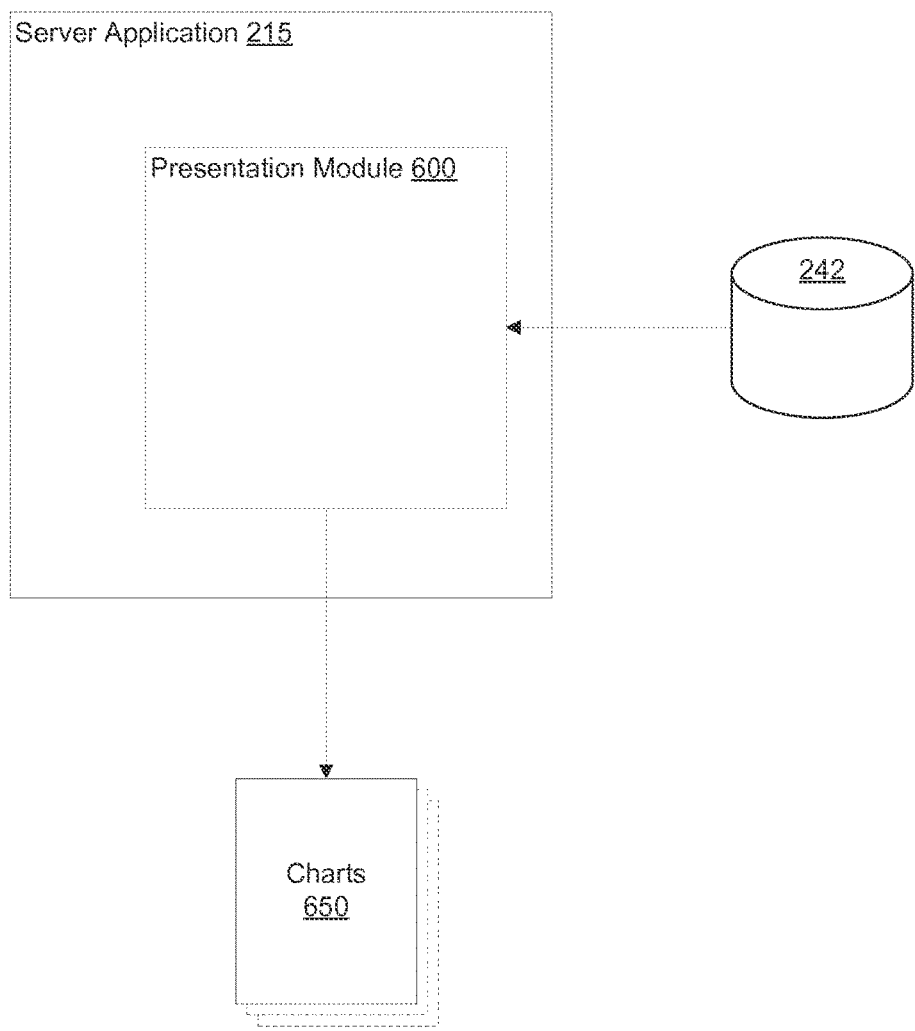
FIG. 6 illustrates a presentation module, in accordance with one embodiment.

FIG. 6 illustrates a presentation module 600, in accordance with one embodiment. The presentation module 600 is configured to generate graphical representations of a dataset that represents the survey response data received from one or more respondents. In one embodiment, the presentation module 600 may be included as a separate component in the server application 215. The presentation module 600 is configured to create charts to be included in one or more presentations. The presentations may be slide show presentations, such as a file compatible with Microsoft® Powerpoint, documents or white papers, such as a file compatible with Microsoft® Word, or any other type of document or multimedia file that may include a graphical representation of the data set.

The presentation module 600 is capable of filtering the dataset to select data to be represented in a chart. Queries may be applied to the survey response data in the survey database 242. The queries may return the data to be represented by the chart. The selected data may then be used to create one or more charts 650, such as line charts, bar graphs, pie charts, and the like. For example, a query may select all responses to a particular survey question provided by a plurality of respondents. The presentation module 600 may then calculate the total number of respondents that submitted an answer to the question and the number of respondents that provided each distinct answer to the question. These calculated values may then be used as data for generating the chart 650.

In one embodiment, the presentation module 600 may be configured to output a file or other data structure to be imported into a presentation such as a Microsoft® Powerpoint slideshow. The output may comprise a formatted slide including a chart as well as the underlying data used to generate the chart. Consequently, the output includes the data showing the individual responses to one or more questions provided by respondents used to generate the visual representation of the data. The file may be imported into multiple, different presentations and shared between different market research analysts. Furthermore, because the underlying data is included in the file, the other analysts are not limited to only viewing the graphical representation of the data in the chart, but may analyze the raw data used to generate the graphical representation as well.

Customer Portal

Figure 7A:
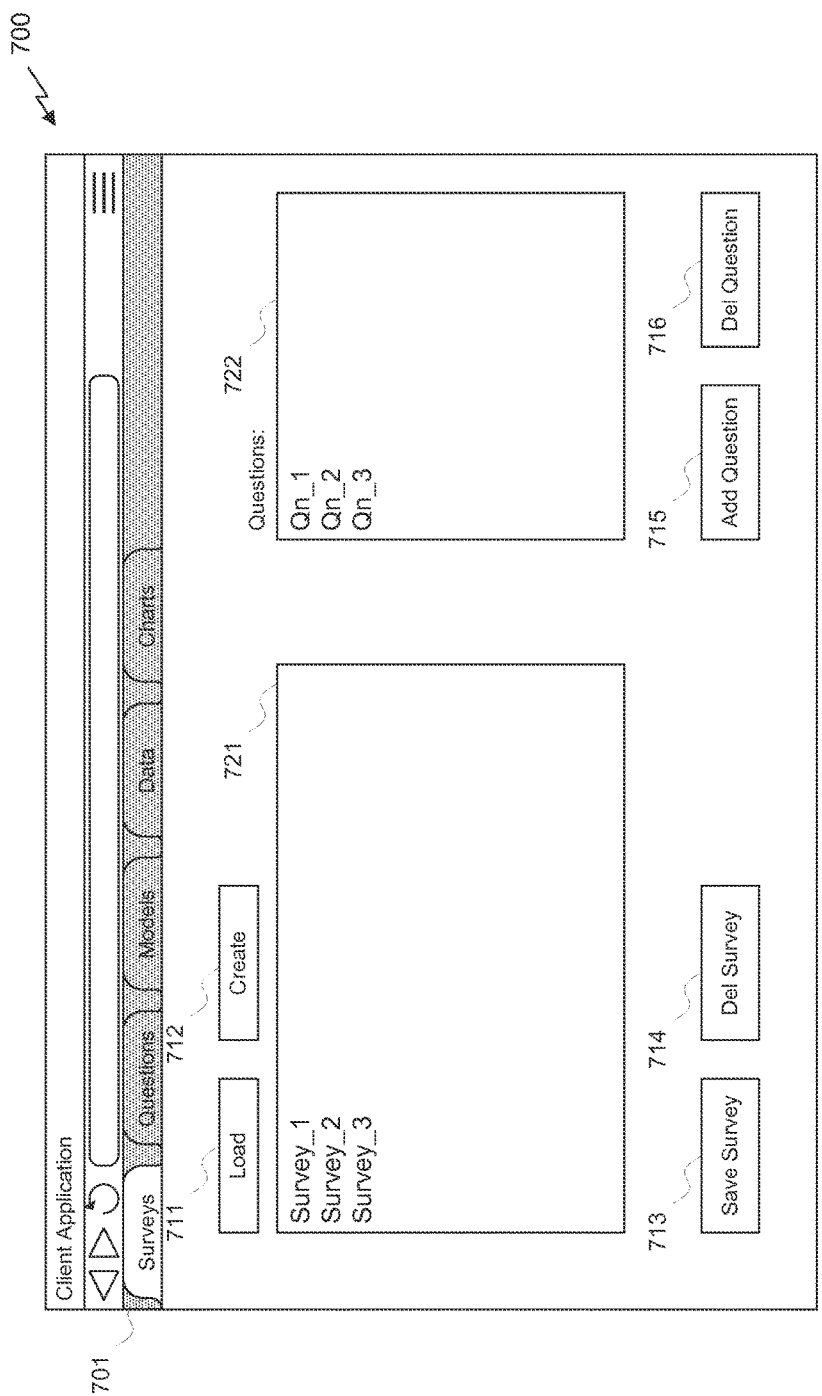
FIGS. 7A-7E illustrate a customer portal used by a market research analyst to access the server application, in accordance with one embodiment.

FIGS. 7A-7E illustrate a customer portal 700 used by a market research analyst to access the server application 215, in accordance with one embodiment. The customer portal 700 includes a graphical user interface (GUI) that is displayed, either within the client application 222 or the browser application 224. As shown in FIG. 7A, the customer portal 700 is displayed within a window of the browser application 224; however, alternatively, the customer portal 700 may be displayed in a window of the client application 222. The GUI may include a number of UI elements that enable the market research analyst to interact with the server application 215.

In one embodiment, the GUI includes a number of tab UI elements, such as a first tab 701, that, when selected by the market research analyst, causes an interface for one aspect of the server application 215 to be displayed. For example, the first tab 701 may be a survey tab, which enables the market research analyst to create or manage surveys 350 via the survey engine 232. The first tab 701 is associated with an interface, displayed in a main pane of the window, that includes various UI elements. In one embodiment, the interface includes a number of buttons and two text boxes. Button 711 and button 712 enable the market research analyst to load a survey 350 from a file system or create a new survey 350, respectively. Active surveys included in the active survey list are shown in text box 721. Button 713 and button 714 enable changes to a survey to be saved to the file system or delete a survey from the active survey list, respectively. The market research analyst may also select a survey 350 in the active survey list and edit the order and number of questions in the survey 350 using the text box 722. In one embodiment, a question may be added by clicking the button 715, which may cause a dialog box to pop up that shows all available questions in the survey database 242. The market research analyst may search and or filter the questions to find one or more questions to add to the selected survey 350. The order to questions in the survey 350 may be controlled by dragging the questions up or down in the text box 722. The market research analyst may also select questions in the text box 722 and remove the selected questions from the survey 350 by clicking on button 716.

Although not shown explicitly, the interface associated with the first tab 701 may also include other UI elements in addition to or in lieu of the UI elements shown in FIG. 7A. For example, the interface may include UI elements for specifying a subset of pre-registered respondents that should receive the survey 350. The interface may also include a UI element that causes a message to be sent to the subset of respondents that informs them that a survey 350 is available to be completed. It will be appreciated that the layout and content of the interfaces shown in FIGS. 7A-7E is illustrative, and that any design enabling a market research analyst to access the functionality of the server application 215 is contemplated as being within the scope of the present disclosure. For example, in another embodiment, the survey tab may be split into multiple tabs, one tab for loading or deleting surveys from the active survey list and another tab for modifying the questions included in a particular survey.

Figure 7B:
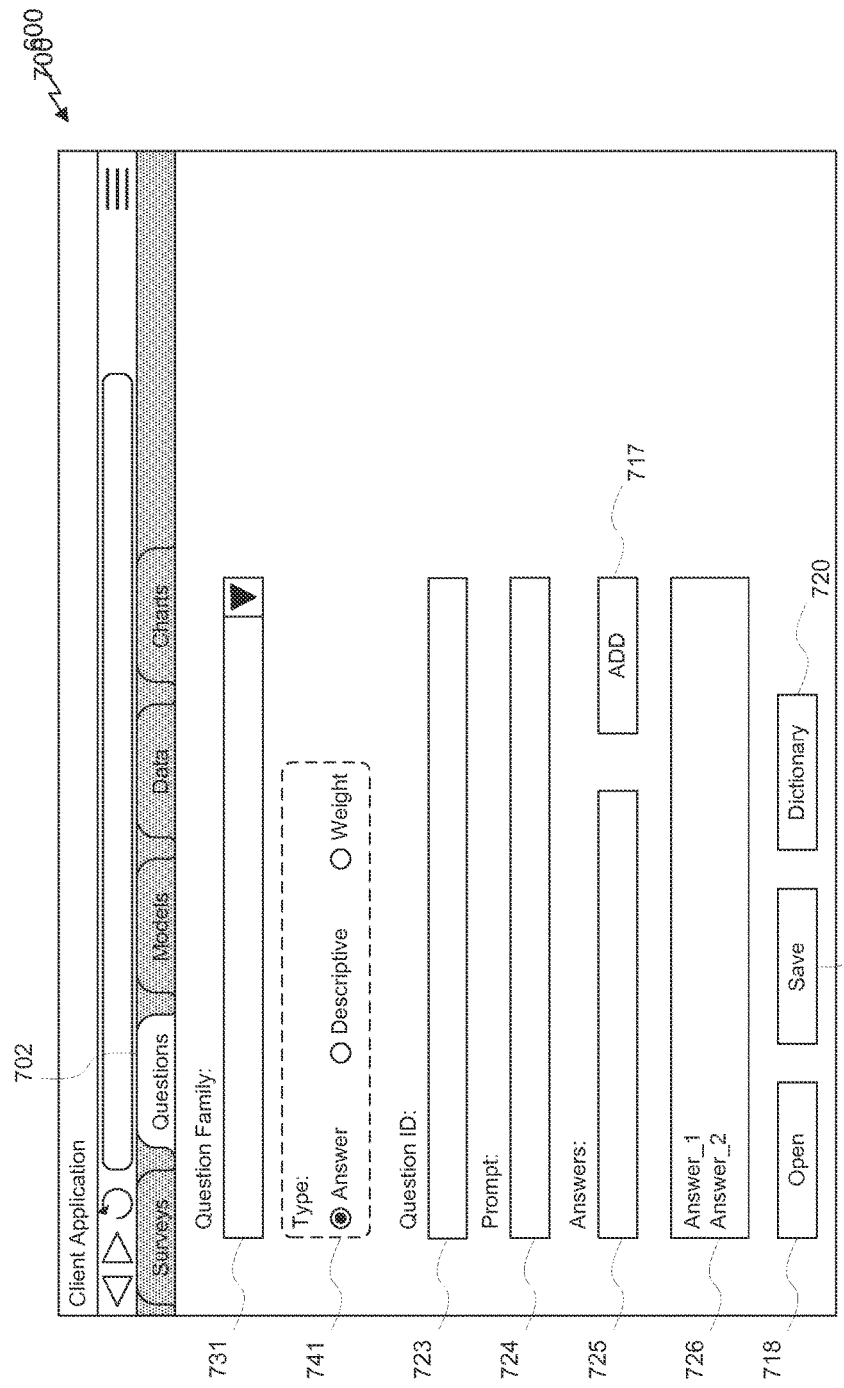

As shown in FIG. 7B, the GUI also includes a second tab 702, which enables the market research analyst to create and/or edit questions stored in the survey database 242. The interface associated with the second tab 702 includes a number of UI elements. A combo box 731 enables the market research analyst to specify a new question family by typing an identifier for the question family into the combo box 731 or select a previously defined question family by clicking on the combo box 731 to drop down a list of all question families defined in the survey database 242. A set of radio buttons 741 enables the market research analyst to select a question type associated with the question family. A text box 723 enables the market research analyst to enter an identifier for the question. A text box 724 enables the market research analyst to enter a prompt for the question. A text box 725 enables the market research analyst to enter a valid answer to the question that will be displayed to a respondent as an option for the respondent's chosen answer when completing the survey 350. Each valid answer may be added to a list of valid answers displayed in text box 726 by selecting the button 717. Valid answers may be deleted by selecting the answer in the text box 726 and hitting the delete button on a keyboard. A button 718 enables the market research analyst to load a question from the survey database 242 for editing. The button 718 may cause a dialog box to open that enables the user to search or filter the questions in the survey database 242 to select the particular question the market research analyst wants to edit. A button 719 enables the market research analyst to save the current question to the survey database 242. A button 720 enables the market research analyst to load a dictionary to search for a question to add to the survey database 242. Again, the interface shown in FIG. 7B is illustrative, and other UI elements in addition to or in lieu of the UI elements described herein may be included in the interface associated with the second tab 702.

Figure 7C:
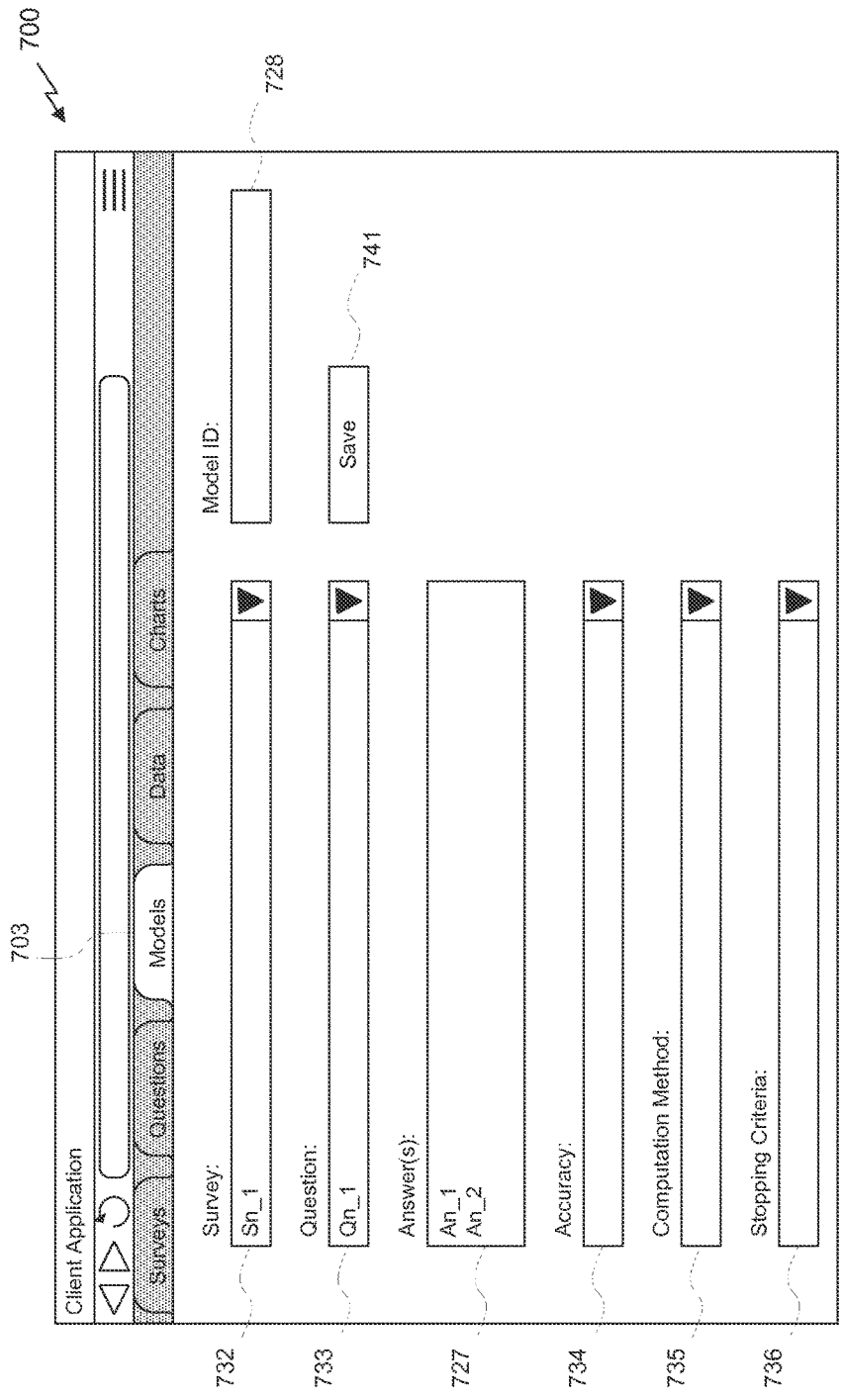

As shown in FIG. 7C, the GUI also includes a third tab 703, which enables the market research analyst to create and/or edit model data structures 450 stored in the model database 244. The interface associated with the third tab 703 includes a number of UI elements. A combo box 732 enables the market research analyst to select a particular survey 350 from the survey database 242. A combo box 733 enables the market research analyst to select a particular question from the selected survey 350. The valid answers for the question may be displayed in a text box 727. The market research analyst may create a model data structure 450 for the selected question by selecting one or more answers in the text box 727 to associate with the model data structure 450. The market research analyst may then specify an accuracy threshold, computation method, and stopping criteria parameters for the model data structure 450 using the combo boxes 734, 735, and 736, respectively. The market research analyst may then specify a model identifier in text box 728 and save the model data structure 450 to the survey database 242 by selecting the button 741. Again, the interface shown in FIG. 7C is illustrative, and other UI elements in addition to or in lieu of the UI elements described herein may be included in the interface associated with the third tab 703.

Figure 7D:
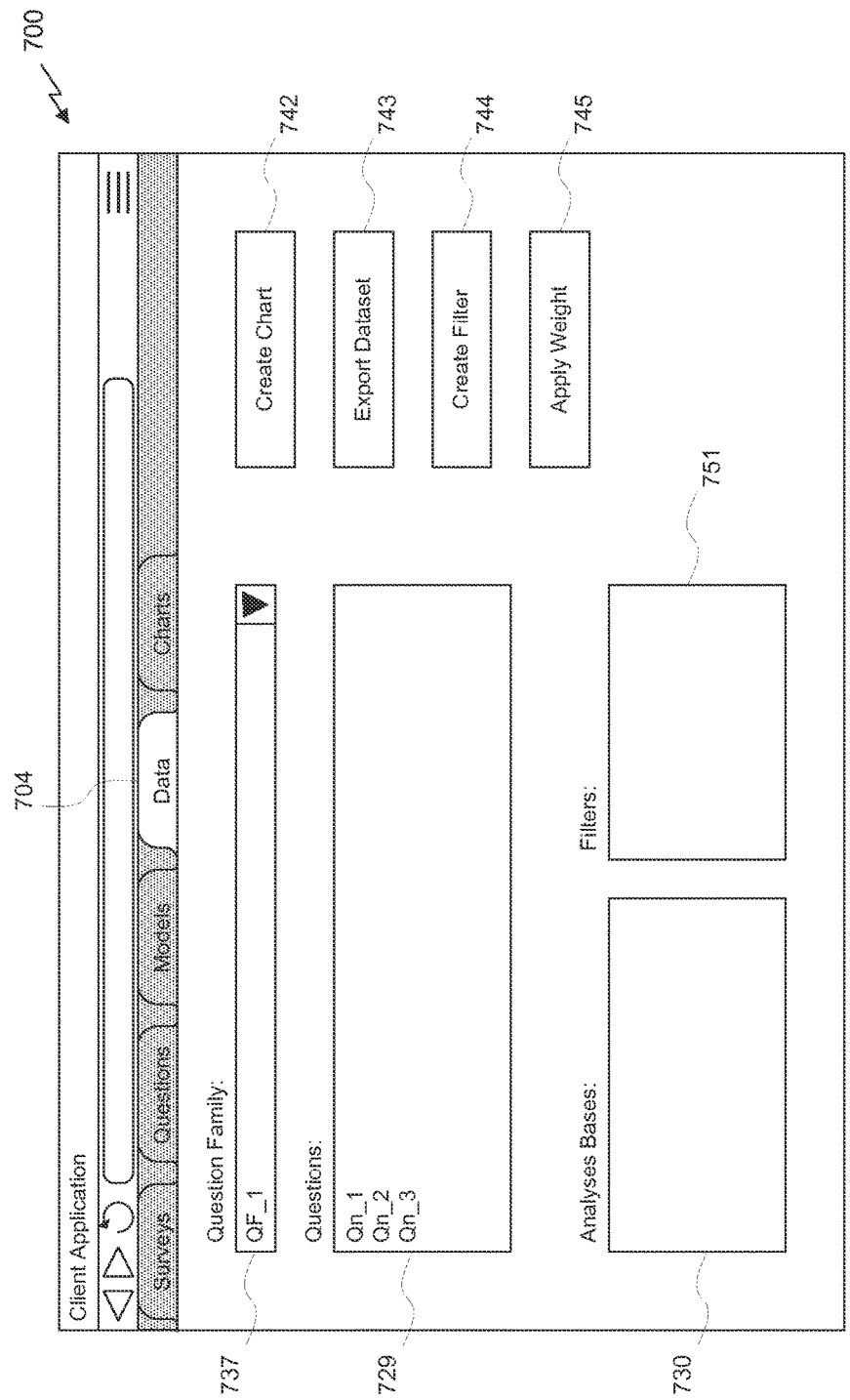

As shown in FIG. 7D, the GUI also includes a fourth tab 704, which enables the market research analyst to analyze the response data provided by one or more respondents. The interface associated with the fourth tab 704 includes a number of UI elements. A combo box 737 enables the market research analyst to select a question family from the survey database 242. The questions in the selected question family are then displayed in the text box 729. The market research analyst may then select a particular question in the text box 729 that the analyst would like to analyze. A text box 730 may list the available analysis bases for analyzing the raw data. The market research analyst may select one of the analysis bases by which the data should be analyzed. Similarly, a text box 751 may list one or more filters to apply to the raw data. The filters, when applied to the survey response data, may only return a subset of the survey response data to be analyzed.

A button 742 may be selected to create a chart for the question based on the analysis method chosen and the applied filters (if any). The button 742 may cause a dialog box to be opened that enables the market research analyst to select options for the type of chart to be created. The chart may be exported to a file system or other data structure stored in a non-volatile memory. A button 743 may export the survey response data stored in the survey database 242 to a file system or other form of non-volatile memory. The button 743 may cause a dialog box to be opened that enables the market research analyst to select whether the full dataset or only a portion of the dataset (e.g., data corresponding to one question, etc.) should be exported from the survey database 242 to a file system or other data structure stored in a non-volatile memory. A button 744 may cause a dialog box to be opened that enables the market research analyst to create a new filter, displayed in the text box 751. A button 745 may enable weights to be applied to each question, for purposes of creating a chart related to two or more questions. Again, the interface shown in FIG. 7D is illustrative, and other UI elements in addition to or in lieu of the UI elements described herein may be included in the interface associated with the fourth tab 704.

Figure 7E:
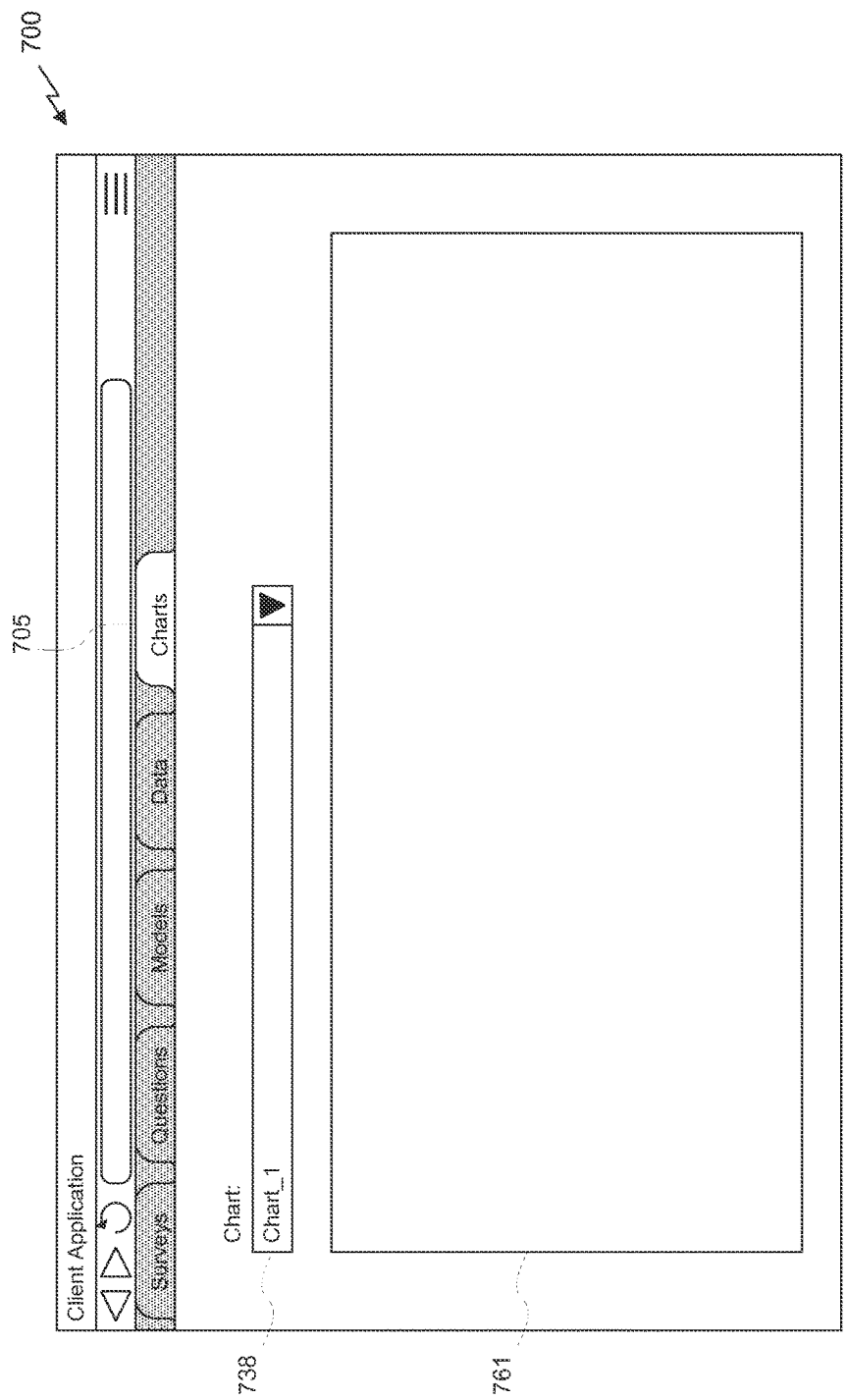

As shown in FIG. 7E, the GUI also includes a fifth tab 705, which enables the market research analyst to view charts created on the data tab. The interface associated with the fifth tab 704 includes a number of UI elements. A combo box 738 enables the market research analyst to select a specific chart to view. A second portion of the interface 761 may be utilized to display the selected chart. The chart may take the form of a graphical representation of the survey response data in the form of a graph or some other format. Again, the interface shown in FIG. 7E is illustrative, and other UI elements in addition to or in lieu of the UI elements described herein may be included in the interface associated with the fifth tab 705.

Although only five tabs with different functionality have been illustrated herein, other tabs may be included in the customer portal 700. For example, a login tab may enable a market research analyst to authenticate a session with the server application 215. Only once the session has been authenticated may the market research analyst access any of the other tabs. In another embodiment, a log tab may enable the market research analyst to view records related to all activity performed in association with the market research project. For example, the market research analyst could review a text-based log file that indicates when respondents have completed surveys, when changes have been made to a survey, or when questions have been added to the survey database 242.

Figure 8A:
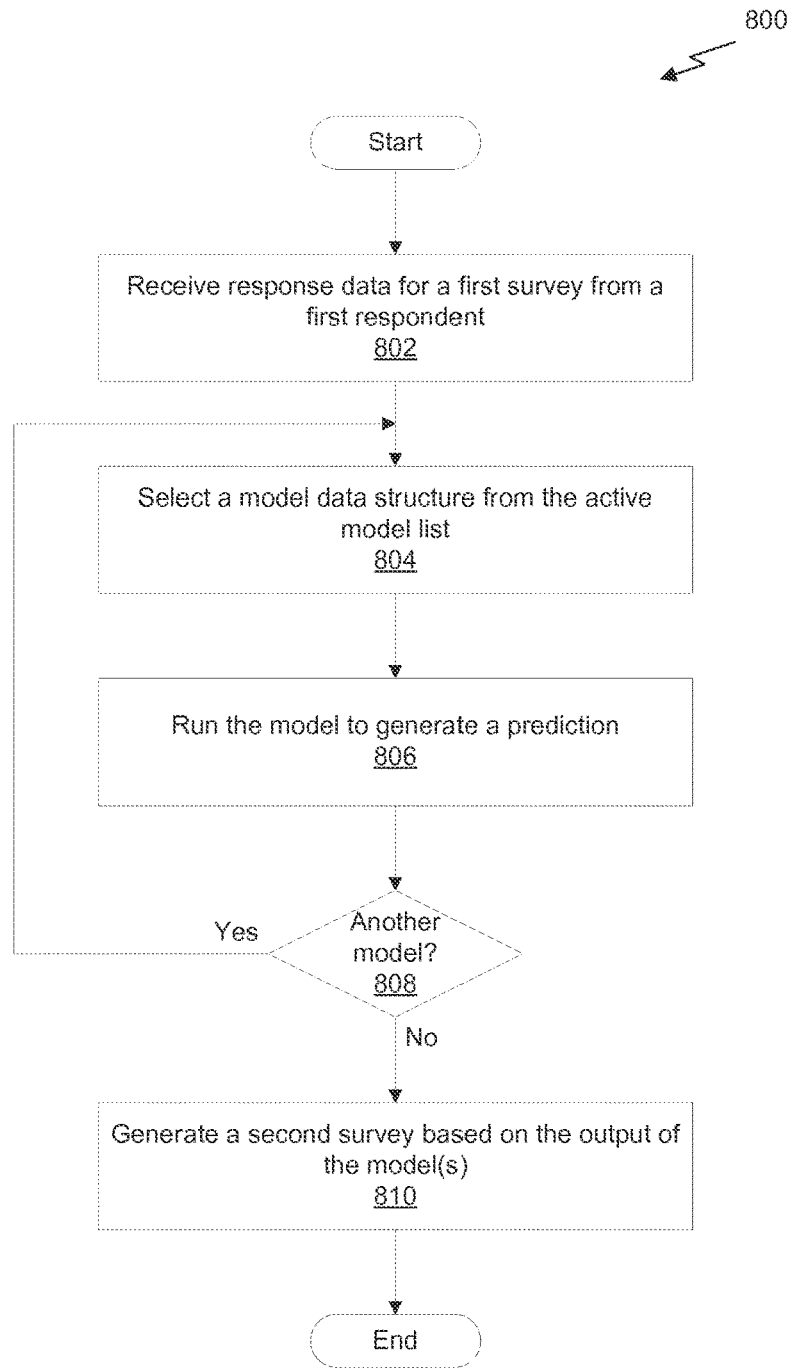
FIG. 8A illustrates a flow chart of a method for generating a survey based on one or more models, in accordance with one embodiment.

FIG. 8A illustrates a flow chart of a method 800 for generating a survey based on one or more models, in accordance with one embodiment. The method 800 may be performed by the server application 215 in response to receiving a completed survey. At step 802, response data for a first survey 350 is received from a first respondent. The response data may contain the respondent's answers to the one or more questions included in the survey 350 and may be stored in the survey database 242. The survey engine 232 may transmit a message to the analysis engine 236 that a survey 350 has been completed by the first respondent. At step 804, in response to receiving the message, the analysis engine 236 selects a model data structure 450 from an active model list associated with the survey 350. Again, each model data structure 450 is associated with a corresponding model, and the active model list indicates which model(s) should be run by the analysis engine 236 after a particular survey 350 has been completed. The analysis engine 236 will run each model associated with a model data structure 450 in the active model list.

At step 806, the analysis engine 236 runs the selected model to generate a prediction. The model may be updated based on the response data received from the first respondent prior to running the model. In one embodiment, the prediction comprises the result of one or more computations performed by implementing an algorithm specified by the computation method parameter of a corresponding model data structure 450. In one embodiment, the result of the computation(s) may be to generate a prediction associated with a question, a measurement of the accuracy of such prediction, and information that defines relationships between the question and one or more additional questions. The measurement of the accuracy may be compared against the accuracy threshold parameter included in the corresponding model data structure 450. If the measurement of the accuracy meets or exceeds the accuracy threshold parameter, then one or more actions specified in the stopping criteria parameter of the corresponding model data structure 450 may be performed. At step 808, the analysis engine 236 determines if another model needs to be run. If the active model list contains at least one more model data structure 450 associated with a model that has not been run after the response data was received from the first respondent, then there is at least one additional model that needs to be run and the method 800 returns to step 804 where another model data structure 450 is selected from the active model list.

Once all the models have been run, at step 810, the survey engine 232 may generate a second survey 350 based on the output of the model(s). The second survey 350 may not include at least one question included in the first survey 350 and may include one or more additional questions not included in the first survey 350. At least one question included in the first survey 350 and not included in the second survey 350 may be associated with a model data structure 450 having an accuracy threshold parameter that was met or exceeded by a corresponding measurement of the accuracy generated by the analysis engine 236. In other words, the stopping criteria of the model data structure 450, when triggered by the comparison of the measured accuracy versus the accuracy threshold parameter, may cause at least one question to be removed from the first survey 350 to generate the second survey 350. The method terminates at step 810 and the second survey 350 may be transmitted to one or more additional respondents to be completed to generate new response data.

Figure 8B:
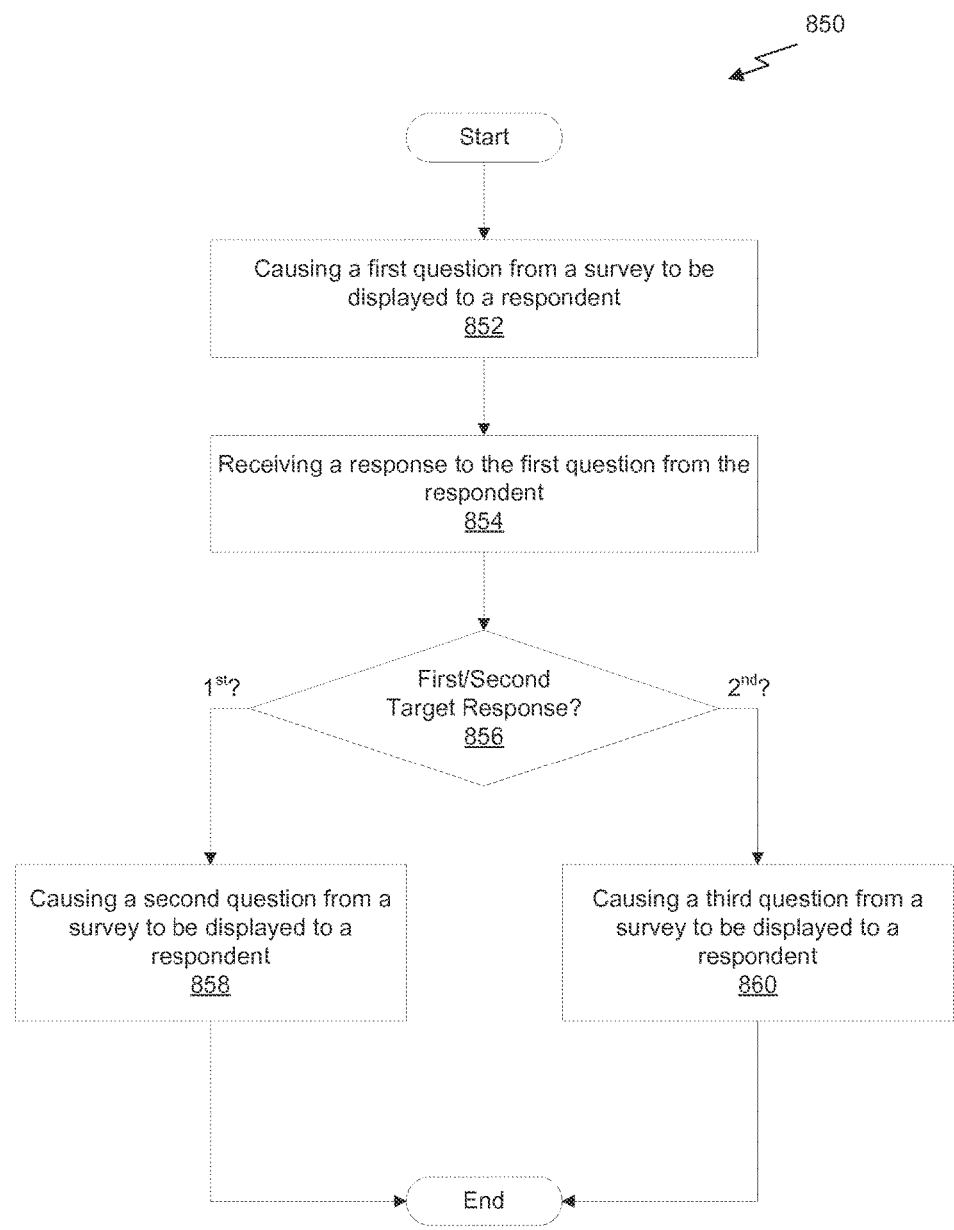
FIG. 8B illustrates a flow chart of a method dynamically generating a survey, in accordance with one embodiment.

FIG. 8B illustrates a flow chart of a method 850 for dynamically generating a survey, in accordance with one embodiment. In one embodiment, questions in a survey 350 are generated dynamically, based on a model that has been updated based on information received from one or more respondents. The model may cause specific questions to be removed from a dynamically generated survey 350 based on answers received from the respondent to earlier questions in the survey 350. In other words, each of the questions in the survey 350 and the order of the questions may be selected dynamically as the respondent completes the survey 350, based on the output of the model that has been continuously updated using the responses provided by the respondent.

At step 852, the survey engine 232 causes a first question to be displayed to a respondent. The first question may include one or more target responses that can be selected by the respondent. At step 854, the survey engine 232 receives a response to the first question from the respondent. At step 856, the survey engine 232 determines whether the response matches a first target response or a second target response. In one embodiment, the survey engine 232 includes logic for identifying which target response associated with the question has been selected as an answer by the respondent. In another embodiment, the survey engine 232 transmits a message to the analysis engine 236 that indicates a response has been received. The analysis engine 236 may then update and run a model based on the received response. The output of the model from the analysis engine 236 may indicate whether the first target response was received or the second target response was received and may be used to determine whether a second question or a third question should be displayed to the respondent.

If the first target response was received, then, at step 858, the survey engine 232 causes the second question to be displayed to the respondent. However, if the second target response was received, then, at step 860, the survey engine 232 causes the third question to be displayed to the respondent. It will be appreciated that the method 850 may be repeated a number of times for a given survey 350 as the respondent answers each question included in the survey 350. Consequently, the model is updated in real-time after each provided answer and the contents of the survey 350 are a reflection of the output of the model. In one embodiment, real-time updates may include providing a real-time update to questions presented based on use of a model. In a separate embodiment, real-time updates may include providing a real-time update to a model which is then used to update questions based on the updated model.

In one embodiment, when the questions for a survey are generated dynamically, the market analyst may specify limitations associated with the survey. The limitations may include a set number of questions, a set amount of time for the respondent to answer questions, etc. Other limitations may be dependent on other variables, such as dependent on the responses provided by the respondent or dependent on whether any relationships between questions are identified by the model(s). In such embodiments, the method 850 may be repeated until one of the limitations is met. For example, questions may be generated dynamically until the respondent has answered 50 questions. Once the limitation is met, the survey 350 is completed and method 850 terminates.

Figure 9:
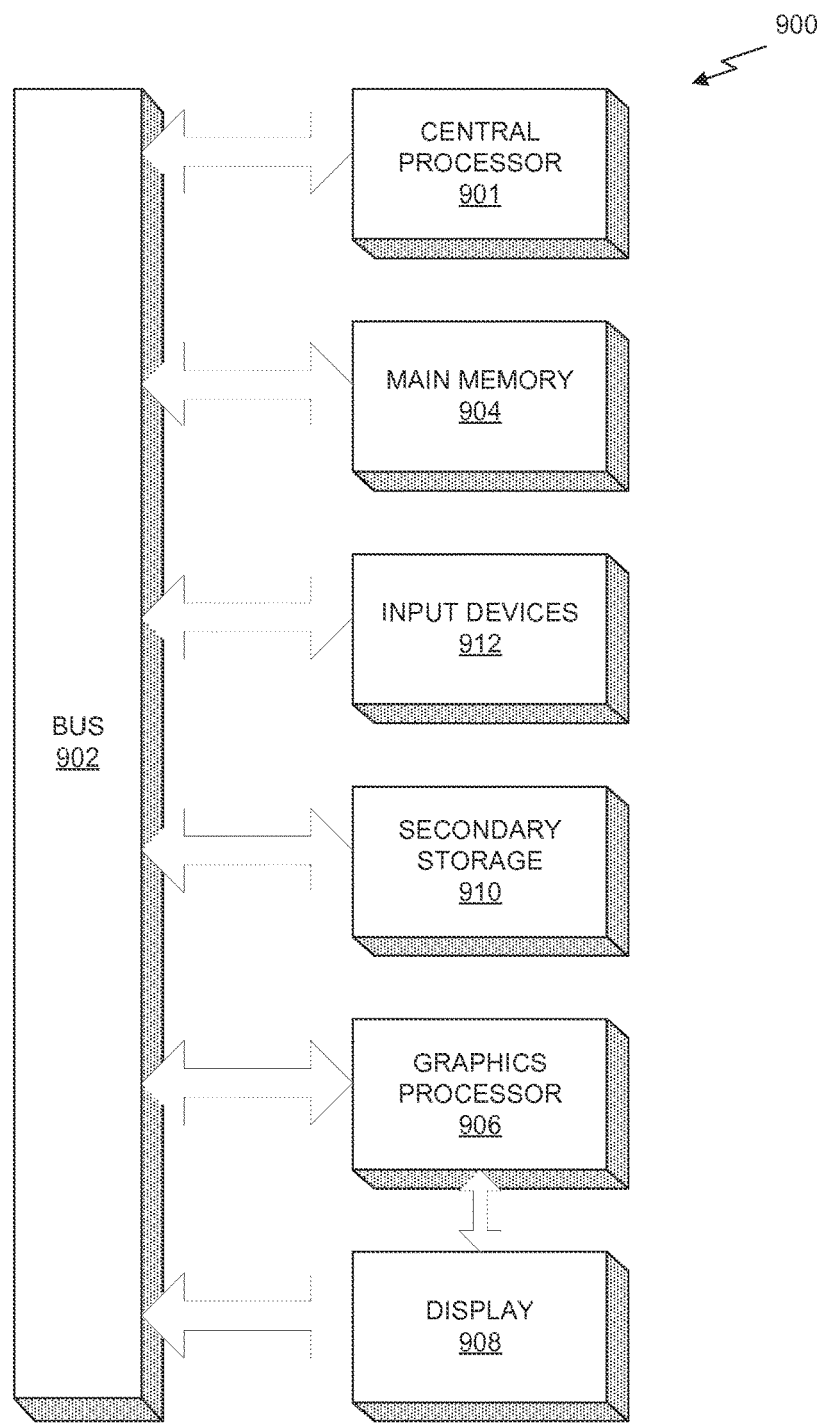
FIG. 9 illustrates an exemplary system in which the various architecture and/or functionality of the various previous embodiments may be implemented.

FIG. 9 illustrates an exemplary system 900 in which the various architecture and/or functionality of the various previous embodiments may be implemented. As shown, a system 900 is provided including at least one central processor 901 that is connected to a communication bus 902. The communication bus 902 may be implemented using any suitable protocol, such as PCI (Peripheral Component Interconnect), PCI-Express, AGP (Accelerated Graphics Port), HyperTransport, or any other bus or point-to-point communication protocol(s). The system 900 also includes a main memory 904. Control logic (software) and data are stored in the main memory 904 which may take the form of random access memory (RAM).

The system 900 also includes input devices 912, a graphics processor 906, and a display 908, i.e. a conventional CRT (cathode ray tube), LCD (liquid crystal display), LED (light emitting diode), plasma display or the like. User input may be received from the input devices 912, e.g., keyboard, mouse, touchpad, microphone, and the like. In one embodiment, the graphics processor 906 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 900 may also include a secondary storage 910. The secondary storage 910 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 904 and/or the secondary storage 910. Such computer programs, when executed, enable the system 900 to perform various functions. The memory 904, the storage 910, and/or any other storage are possible examples of computer-readable media.

In one embodiment, the architecture and/or functionality of the various previous figures may be implemented in the context of the central processor 901, the graphics processor 906, an integrated circuit (not shown) that is capable of at least a portion of the capabilities of both the central processor 901 and the graphics processor 906, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 900 may take the form of a desktop computer, laptop computer, server, workstation, game consoles, embedded system, and/or any other type of logic. Still yet, the system 900 may take the form of various other devices including, but not limited to a personal digital assistant (PDA) device, a mobile phone device, a television, etc.

Further, while not shown, the system 900 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A system comprising:
a server computer executing a server application to:
receive first information from one or more respondents, using an analysis engine of the server computer, wherein the first information includes at least one response to a first question included in a first survey, wherein the first information includes aggregated data;
update a model including the first survey based on the first information, wherein the updating includes:
performing a computation based on the first information to determine an accuracy related to a prediction for the first question, wherein the accuracy includes an estimation of whether an expected answer submitted by one of the one or respondents would result in a statistically relevant datapoint, wherein the prediction is generated by calculating a relationship between the first question and each of:
an answer to a second question by a same respondent of the one or more respondents in the first survey,
an answer to the second question by a different respondent of the one or more respondents in the first survey,
an answer to the second question by a different respondent of the one or more respondents in a different survey, and
other data that is unrelated to the first or second questions, including at least one of purchase data and website usage,
determining that the accuracy is above a level of an accuracy threshold included in the model, and
in response to determining that the accuracy is above the level of the accuracy threshold included in the model, performing one or more actions specified in a stopping criteria of the model;
generate a second survey, using a survey engine of the server computer, based on the updated model, by:
determining whether the stopping criteria is satisfied, and when the stopping criteria is satisfied, then the one or more actions specified in the stopping criteria cause at least one question to be removed from the first survey to generate the second survey, and when the stopping criteria is not satisfied, then the one or more actions specified in the stopping criteria cause at least one additional question to be added to the second survey;
receiving second information from one or more additional respondents;
running the updated model to determine a probability of a first respondent of the one or more additional respondents to provide an answer to a third question associated with a first aspect of the second information;
determining whether the third question is used to predict a response to a fourth question;
based on the probability, determining whether to remove or add the third question to the second survey, wherein if the third question is predicted by other questions, then the third question is removed from the second survey unless the third question is used to predict the response to the fourth question;
updating the model including the second survey based on the second information to generate a third survey, using the survey engine.

2. The system of claim 1, wherein the server application includes the survey engine and the analysis engine, the survey engine configured to:
receive the first information from the one or more respondents; and
in response to receiving the first information, transmit a message to the analysis engine to update the model.

3. The system of claim 2, wherein the analysis engine is configured to transmit a message to the survey engine in response to updating the model, and the survey engine is configured to generate the second survey in response to receiving the message.

4. The system of claim 1, wherein the model comprises a data structure storing a number of parameters, the parameters including a survey identifier, a question identifier, a target response, an accuracy threshold, a computation method, and stopping criteria.

5. The system of claim 1, further comprising:
a client application included on a client computer, the client application configured to communicate with the server application via a network.

6. The system of claim 5, wherein the client application comprises a thin client implemented within a browser, the client application configured to communicate with the server application via HTTP request and HTTP response messages.

7. The system of claim 5, wherein the client application is configured to display one or more charts, each chart is a graphical representation of the first or second information.

8. The system of claim 1, wherein generating the second survey comprises:
causing the third question to be displayed to a respondent;
receiving a response to the third question from the respondent;
determining whether the response matches a first target response or a second target response; and
if the response matches the first target response, causing the fourth question to be displayed to the respondent, or
if the response matches the second target response, causing a fifth question to be displayed to the respondent.

9. The system of claim 1, wherein performing the computation comprises implementing an algorithm specified by the model to determine the accuracy.

10. The system of claim 1, wherein the first information comprises a number of responses to a corresponding number of questions in the first survey for each of the one or more respondents.

11. The system of claim 1, wherein the computation, using a computation engine of the server computer, includes running a plurality of models for the model.

12. The system of claim 1, wherein the computation is used to generate the prediction, a measurement of the accuracy, and secondary information that defines one or more relationships between the first question and one or more additional questions.

13. The system of claim 1, wherein the one or more actions specified by the stopping criteria include deactivating the first survey, activating a new survey, or removing one or more questions from the first survey.

14. A non-transitory computer-readable storage medium storing instructions that, when executed by a processor, cause the processor to perform steps comprising:

receiving, using the processor, first information from one or more respondents, using an analysis engine of a server computer, wherein the first information includes at least one response to a first question included in a first survey, wherein the first information includes aggregated data;
updating, using the processor, a model including the first survey based on the first information, wherein the updating includes:
performing a computation based on the first information to determine an accuracy related to a prediction for the first question, wherein the accuracy includes an estimation of whether an expected answer submitted by one of the one or respondents would result in a statistically relevant datapoint, wherein the prediction is generated by calculating a relationship between the first question and each of:
an answer to a second question by a same respondent of the one or more respondents in the first survey,
an answer to the second question by a different respondent of the one or more respondents in the first survey,
an answer to the second question by a different respondent of the one or more respondents in a different survey, and
other data that is unrelated to the first or second questions, including at least one of purchase data and website usage,
determining that the accuracy is above a level of an accuracy threshold included in the model, and
in response to determining that the accuracy is above the level of the accuracy threshold included in the model, performing one or more actions specified in a stopping criteria of the model;
generating, using the processor, a second survey, using a survey engine of the server computer, based on the updated model, by:
determining whether the stopping criteria is satisfied, and when the stopping criteria is satisfied, then the one or more actions specified in the stopping criteria cause at least one question to be removed from the first survey to generate the second survey, and when the stopping criteria is not satisfied, then the one or more actions specified in the stopping criteria cause at least one additional question to be added to the second survey;
receiving second information from one or more additional respondents;
running the updated model to determine a probability of a first respondent of the one or more additional respondents to provide an answer to a third question associated with a first aspect of the second information;
determining whether the third question is used to predict a response to a fourth question;
based on the probability, determining whether to remove or add the third question to the second survey, wherein if the third question is predicted by other questions, then the third question is removed from the second survey unless the third question is used to predict the response to the fourth question;
updating the model, using the processor, including the second survey based on the second information to generate a third survey, using the survey engine.

15. The non-transitory computer-readable storage medium of claim 14, wherein the model comprises a data structure storing a number of parameters, the parameters including a survey identifier, a question identifier, a target response, an accuracy threshold, a computation method, and stopping criteria.

16. The non-transitory computer-readable storage medium of claim 14, wherein generating the second survey comprises:
   causing the third question to be displayed to a respondent;
   receiving a response to the third question from the respondent;
   determining whether the response matches a first target response or a second target response; and
   if the response matches the first target response, causing the fourth question to be displayed to the respondent, or
   if the response matches the second target response, causing a fifth question to be displayed to the respondent.

17. A method, comprising:
   receiving, by a server computer, first information from one or more respondents, using an analysis engine of a server computer, wherein the first information includes at least one response to a first question included in a first survey, wherein the first information includes aggregated data;
   updating a model including the first survey based on the first information, wherein the updating includes:
      performing a computation based on the first information to determine an accuracy related to a prediction for the first question, wherein the accuracy includes an estimation of whether an expected answer submitted by one of the one or respondents would result in a statistically relevant datapoint, wherein the prediction is generated by calculating a relationship between the first question and each of:
         an answer to a second question by a same respondent of the one or more respondents in the first survey,
         an answer to the second question by a different respondent of the one or more respondents in the first survey,
         an answer to the second question by a different respondent of the one or more respondents in a different survey, and
         other data that is unrelated to the first or second questions, including at least one of purchase data and website usage,
      determining that the accuracy is above a level of an accuracy threshold included in the model, and
      in response to determining that the accuracy is above the level of the accuracy threshold included in the model, performing one or more actions specified in a stopping criteria of the model;
   generating a second survey, using a survey engine of the server computer, based on the updated model, by:
      determining whether the stopping criteria is satisfied, and when the stopping criteria is satisfied, then the one or more actions specified in the stopping criteria cause at least one question to be removed from the first survey to generate the second survey, and when the stopping criteria is not satisfied, then the one or more actions specified in the stopping criteria cause at least one additional question to be added to the second survey;
      receiving second information from one or more additional respondents;
      running the updated model to determine a probability of a first respondent of the one or more additional respondents to provide an answer to a third question associated with a first aspect of the second information;
      determining whether the third question is used to predict a response to a fourth question;
      based on the probability, determining whether to remove or add the third question to the second survey, wherein if the third question is predicted by other questions, then the third question is removed from the second survey unless the third question is used to predict the response to the fourth question;
   updating the model including the second survey based on the second information to generate a third survey, using the survey engine.

18. The method of claim 17, wherein the model comprises a data structure storing a number of parameters, the parameters including a survey identifier, a question identifier, a target response, an accuracy threshold, a computation method, and stopping criteria.

19. The method of claim 17, wherein generating the second survey comprises:
   causing the third question to be displayed to a respondent;
   receiving a response to the third question from the respondent;
   determining whether the response matches a first target response or a second target response; and
   if the response matches the first target response, causing the fourth question to be displayed to the respondent, or
   if the response matches the second target response, causing a fifth question to be displayed to the respondent.

* * * * *